US012718025B2

(12) United States Patent
Ji et al.

(10) Patent No.: US 12,718,025 B2
(45) **Date of Patent: *Aug. 25, 2026**

(54) TRAINING METHOD FOR NATURAL LANGUAGE PROCESSING MODEL, AND TEXT PROCESSING METHOD AND APPARATUS

(71) Applicants: Beijing BOE Technology Development Co., Ltd., Beijing (CN); BOE Technology Group Co., Ltd., Beijing (CN)

(72) Inventors: Chao Ji, Beijing (CN); Boran Jiang, Beijing (CN); Hongxiang Shen, Beijing (CN); Zhenzhong Zhang, Beijing (CN); Ge Ou, Beijing (CN); Chuqian Zhong, Beijing (CN); Shuqi Wei, Beijing (CN); Pengfei Zhang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 151 days.

This patent is subject to a terminal disclaimer.

(21) Appl. No.: 18/844,037

(22) PCT Filed: Mar. 7, 2023

(86) PCT No.: PCT/CN2023/080141

§ 371 (c)(1),
(2) Date: Sep. 4, 2024

(87) PCT Pub. No.: WO2023/169431

PCT Pub. Date: Sep. 14, 2023

(65) Prior Publication Data

US 2025/0190704 A1 Jun. 12, 2025

(30) Foreign Application Priority Data

Mar. 8, 2022 (CN) ......................... 202210218846.7

(51) Int. Cl.
*G06F 40/30* (2020.01)
*G06F 40/20* (2020.01)

(52) U.S. Cl.
CPC .............. *G06F 40/30* (2020.01); *G06F 40/20* (2020.01)

(58) Field of Classification Search
CPC ................................ G06F 40/30; G06F 40/20
See application file for complete search history.

(56) References Cited

U.S. PATENT DOCUMENTS 9,298,702 B1 3/2016 Faletti et al.
11,227,217 B1 * 1/2022 Wang .................... G06F 16/353
(Continued)

FOREIGN PATENT DOCUMENTS

CN 110263324 A 9/2019
CN 111651557 A 9/2020
(Continued)

OTHER PUBLICATIONS

PCT/CN2023/080141 international search report dated Jun. 8, 2023.
PCT/CN2023/080141 Written Opinion dated Jun. 8, 2023.

*Primary Examiner* — Kevin Ky
(74) *Attorney, Agent, or Firm* — IPro, PLLC

(57) ABSTRACT

The present disclosure relates to a method for training a natural language processing model, a text processing method and an apparatus, where the method for training a natural language processing model includes: obtaining a sample text; determining a triple in the sample text, where the triple includes two entities in the sample text and a relation between the two entities; processing the sample text based on the triple to obtain a knowledge fusion vector; and (Continued)

inputting the knowledge fusion vector into the natural language processing model for training to obtain a target model. The sample text may be processed based on the triple in the sample text to obtain a knowledge fusion vector. Compared with the sample text, the knowledge fusion vector contains other triple information besides the sample text information itself, so that a computer obtains the true meaning of the sample text more accurately.

20 Claims, 14 Drawing Sheets

(56) References Cited

U.S. PATENT DOCUMENTS

| | | | | |
|---|---|---|---|---|
| 12,572,828 | B2 * | 3/2026 | Fang | G06N 5/04 |
| 2019/0311003 | A1 | 10/2019 | Tonkin et al. | |
| 2020/0372246 | A1 * | 11/2020 | Chidananda | G06N 3/0455 |
| 2022/0027657 | A1 * | 1/2022 | Li | G06V 10/44 |
| 2022/0198149 | A1 * | 6/2022 | Wu | G06F 40/284 |
| 2023/0035475 | A1 * | 2/2023 | Cheng | G01S 17/89 |
| 2023/0113322 | A1 * | 4/2023 | Liu | H04W 4/02<br>340/902 |
| 2023/0169309 | A1 * | 6/2023 | Yang | G06N 3/0455<br>706/23 |
| 2025/0190704 | A1 * | 6/2025 | Ji | G06F 40/20 |

FOREIGN PATENT DOCUMENTS

| | | | |
|---|---|---|---|
| CN | 113254667 | A | 8/2021 |
| CN | 113486189 | A | 10/2021 |
| CN | 114330281 | A | 4/2022 |

* cited by examiner

TRAINING METHOD FOR NATURAL LANGUAGE PROCESSING MODEL, AND TEXT PROCESSING METHOD AND APPARATUS

TECHNICAL FIELD

The present disclosure relates to the field of artificial intelligence, and specifically, to a method for training a natural language processing model, an apparatus for training a natural language processing model, and a computer-readable storage medium.

BACKGROUND

The current natural language processing (NLP) technology, when training the NLP model, mainly uses the sample of the natural language text itself, but the natural language text itself contains relatively limited features, so according to the natural language text itself, the processing effect of the trained natural language processing model is not very ideal.

SUMMARY

The present disclosure provides a method for training a natural language processing model, an apparatus for training a natural language processing model, and a computer-readable storage medium, to solve the deficiencies in the related art.

According to the first aspect of the embodiments of the present disclosure, a method for training a natural language processing model is provided, including: obtaining a sample text; determining a triple in the sample text, where the triple includes two entities in the sample text and a relation between the two entities; processing the sample text based on the triple to obtain a knowledge fusion vector; and inputting the knowledge fusion vector into the natural language processing model for training to obtain a target model; where the natural language processing model includes at least one feature extraction layer, and the feature extraction layer is configured to: perform a linear transformation on the knowledge fusion vector, to obtain at least two knowledge fusion matrices including a first knowledge fusion matrix and a second knowledge fusion matrix; determine an association matrix according to the first knowledge fusion matrix, where the association matrix represents association relation between at least one entity in the sample text and tokens in the sample text; and determine a weight matrix according to the second knowledge fusion matrix and the association matrix, where the weight matrix represents weight between the at least one entity and the sample text.

Optionally, the at least one feature extraction layer at least includes a first feature extraction layer and a second feature extraction layer; and a dimensionality of the association matrix in the second feature extraction layer is variable relative to a dimensionality of the weight matrix in the first feature extraction layer.

Optionally, the dimensionality of the association matrix in the second feature extraction layer is less than the dimensionality of the weight matrix in the first feature extraction layer.

Optionally, the at least one feature extraction layer further includes at least one third feature extraction layer, and the third feature extraction layer includes a masking matrix, the masking matrix is configured to perform partial masking on the association matrix.

Optionally, the at least one third feature extraction layer is arranged after the first feature extraction layer.

Optionally, the method further includes freezing the second feature extraction layer when a training task is a generation task; and freezing the at least one third feature extraction layer when the training task is a semantic understanding task.

Optionally, a first dimensionality transformation layer is further included between the first feature extraction layer and the second feature extraction layer, and configured to: perform a dimensionality variation on the weight matrix obtained by the first feature extraction layer, to obtain an output matrix after the dimensionality variation as an input of the second feature extraction layer, to implement dimensionality variation between the feature extraction layers.

Optionally, before the second feature extraction layer and the at least one third feature extraction layer, a splitting layer is further included, and configured to split an output of the first feature extraction layer into triple information and text information; where the first dimensionality transformation layer is configured to perform a dimensionality variation on the weight matrix obtained by the first feature extraction layer to obtain the output matrix after a dimensionality reduction as the input of the second feature extraction layer, or is configured to perform a dimensionality variation on the triple information to obtain a matrix after dimensionality reduction as the input of the second feature extraction layer; and a second dimensionality transformation layer is further included between the first feature extraction layer and the third feature extraction layer, and configured to: perform a dimensionality variation on the weight matrix obtained by the first feature extraction layer to obtain an output matrix after the dimensionality variation as an input of the at least one third feature extraction layer, or is configured to perform a dimensionality variation on the text information to obtain a matrix after a dimensionality reduction as an input of the at least one third feature extraction layer.

Optionally, processing the sample text based on the triple to obtain a knowledge fusion vector includes: fusing the sample text and the triple in the sample text to obtain the knowledge fusion vector.

Optionally, fusing the sample text and the triple in the sample text to obtain the knowledge fusion vector includes: inserting the triple in the sample text into the sample text to obtain the knowledge fusion vector.

Optionally, fusing the sample text and the triple in the sample text to obtain the knowledge fusion vector includes: determining a text embedding vector corresponding to the sample text; determining a knowledge embedding vector corresponding to the triple; and fusing the text embedding vector and the knowledge embedding vector, to obtain the knowledge fusion vector.

Optionally, the triple includes at least one of the following: ahead entity, a relation, or a tail entity.

Optionally, determining the knowledge embedding vector corresponding to the triple includes: fusing an embedding vector of the head entity, an embedding vector of the relation, and an embedding vector of the tail entity, to obtain the knowledge embedding vector: $e_k$=concat($h_e$+$r_e$+$t_e$); where, $e_k$ represents the knowledge embedding vector, $h_e$ represents the embedding vector of the head entity, $r_e$ represents the embedding vector of the relation, $t_e$ represents the embedding vector of the tail entity, concat(represents a concatenation function.

Optionally, the text embedding vector may include the text embedding vector itself and at least one of the following: a sentence embedding vector, a position embedding vector corresponding to the tokens, or a task type embedding vector.

Optionally, the knowledge embedding vector includes at least one of the following: an embedding vector of the entities belonging to the triple; or an embedding vector of the relation belonging to the triple.

Optionally, fusing the sample text and the triple in the sample text includes: performing feature extraction on the text embedding vector through the at least one feature extraction layer to obtain a text feature vector; performing feature extraction on the knowledge embedding vector through the at least one feature extraction layer to obtain a knowledge feature vector; and fusing the text feature vector and the knowledge feature vector, to obtain the knowledge fusion vector.

Optionally, fusing the text feature vector and the knowledge feature vector includes: fusing the text feature vector and the knowledge feature vector through a multi-layer neural network layer.

Optionally, fusing the sample text and the triple in the sample text includes: fusing the text embedding vector and the knowledge embedding vector according to a knowledge fusion model, the knowledge fusion model includes:

$$f_i = \sigma\left(W_t^i e_t^i + W_e^i e_k^i + b_i\right);$$

where, $f_j$ represents the knowledge fusion vector, $e_t$ represents the text embedding vector, $e_k$ represents the knowledge embedding vector, $W_t$ represents a weight of the text embedding vector, $W_e$ represents a weight of the knowledge embedding vector, b represents a bias, i represents the i-th token in a corresponding sample text.

Optionally, a relationship between a learning rate of training the natural language processing model and a quantity of samples input into the natural language processing model for each training is as follows: $Y=5.57e^{-6}\cdot\log_2 X-4.75e^{-6}$; where, X represents a quantity (batchsize) of samples input into the natural language processing model for each training, and Y represents the learning rate.

Optionally, the method further includes: determining a target sample set according to a target training task; and training an overall model according to the target sample set, where the overall model includes a target model and a fine-tuning model.

Optionally, the fine-tuning model includes at least one of the following: a convolutional neural network model (CNN); a recurrent neural network model (RNN); a gated recurrent unit model (GRU); a fully connected layer (FC); or a long short-term memory model (LSTM).

Optionally, the method further includes: performing at least one round of the following steps: selecting and superimposing a pre-training task according to a preset order, and upon completing pre-training task selection each time, training the natural language processing model according to a superimposed pre-training task.

Optionally, the method further includes: randomly selecting and superimposing one or more pre-training tasks, and upon completing pre-training task selection each time, training the natural language processing model according to a superimposed pre-training task, where a learning rate of training the natural language processing model is positively correlated with a quantity of samples input into the natural language processing model for each training.

According to the second aspect of the embodiments of the present disclosure, a text processing method is provided, including: obtaining a target text; determining a triple in the target text, where the triple includes two entities in the target text and a relation between the two entities; processing the target text based on the triple to obtain a knowledge fusion vector; and inputting the knowledge fusion vector into a target model to obtain a processing result of the target text; where the target model includes at least one feature extraction layer, and the feature extraction layer is configured to: perform a linear transformation on the knowledge fusion vector, to obtain at least two knowledge fusion matrices including a first knowledge fusion matrix and a second knowledge fusion matrix; determine an association matrix according to the first knowledge fusion matrix, where the association matrix represents association relation between at least one entity in the target text and tokens in the target text; and determine a weight matrix according to the second knowledge fusion matrix and the association matrix, where the weight matrix represents weight between the at least one entity and the target text.

Optionally, the at least one feature extraction layer at least includes a first feature extraction layer and a second feature extraction layer, and a dimensionality of the association matrix in the second feature extraction layer is variable relative to a dimensionality of the weight matrix in the first feature extraction layer.

Optionally, the at least one feature extraction layer further includes at least one third feature extraction layer, and the third feature extraction layer includes a masking matrix, the masking matrix is configured to perform partial masking on the association matrix.

Optionally, a first dimensionality transformation layer is further included between the first feature extraction layer and the second feature extraction layer, and configured to: perform a dimensionality variation on the weight matrix obtained by the first feature extraction layer, to obtain an output matrix after the dimensionality variation as an input of the second feature extraction layer, to implement the dimensionality variation between the feature extraction layers.

Optionally, before the second feature extraction layer and the at least one third feature extraction layer, a splitting layer is further included, and configured to split an output of the first feature extraction layer into triple information and text information; where the first dimensionality transformation layer is configured to perform a dimensionality variation on the weight matrix obtained by the first feature extraction layer to obtain the output matrix after a dimensionality reduction as the input of the second feature extraction layer, or perform a dimensionality variation on the triple information to obtain a matrix after a dimensionality reduction as the input of the second feature extraction layer; a second dimensionality transformation layer is further included between the first feature extraction layer and the at least one third feature extraction layer, and configured to: perform a dimensionality variation on the weight matrix obtained by the first feature extraction layer to obtain an output matrix after the a dimensionality reduction as an input of the third feature extraction layer, or is configured to perform a dimensionality variation on the text information to obtain a matrix after dimensionality reduction as an input of the at least one third feature extraction layer.

Optionally, processing the target text based on the triple to obtain the knowledge fusion vector includes: inserting the triple in the target text into the target text to obtain the knowledge fusion vector.

Optionally, processing the target text based on the triple to obtain the knowledge fusion vector includes: determining a text embedding vector corresponding to the target text; determining a knowledge embedding vector corresponding to the triple; and fusing the text embedding vector and the knowledge embedding vector, to obtain the knowledge fusion vector.

Optionally, the target model includes a fine-tuning model, and the fine-tuning model includes at least one of the following: a convolutional neural network model (CNN); a recurrent neural network model (RNN); a gated recurrent unit model (GRU); a fully connected layer (FC); or a long short-term memory model (LSTM).

According to the third aspect of the embodiments of the present disclosure, a text processing apparatus is provided, including a processor, where the processor is configured to: obtain a target text; determine triple in the target text, where the triple includes two entities in the target text and a relation between the two entities; process the target text based on the triple to obtain a knowledge fusion vector; and input the knowledge fusion vector into a target model to obtain a processing result of the target text; where the target model includes at least one feature extraction layer, and the feature extraction layer is configured to: perform a linear transformation on the knowledge fusion vector, to obtain at least two knowledge fusion matrices including a first knowledge fusion matrix and a second knowledge fusion matrix; determine an association matrix according to the first knowledge fusion matrix, where the association matrix represents association relation between at least one entity in the target text and tokens in the target text; and determine a weight matrix according to the second knowledge fusion matrix and the association matrix, where the weight matrix represents weight between the at least one entity and the target text.

Optionally, the apparatus further includes: an interaction module, configured to determine whether to obtain the triple in the target text based on a knowledge graph according to a user operation; where, when determining to obtain the triple in the target text based on the knowledge graph, determine the triple corresponding to the target text in the knowledge graph; and when determining to obtain the triple in the target text not based on the knowledge graph, determine the triple in the target text.

Optionally, the interaction module is further configured to: display the triple corresponding to the target text in the knowledge graph; and adjust the displayed triple according to a user operation, and use the adjusted triple as the triple corresponding to the target text in the knowledge graph.

Optionally, the interaction module is further configured to, when determining to obtain the target model trained based on the knowledge graph, receive a triple input by a user as the triple corresponding to the target text in the knowledge graph.

Optionally, the interaction module is further configured to select the target model according to the user operation, where the target model includes at least one of the following: CNN, RNN, GRU, LSTM, Transformer, or Transformer-XL.

Optionally, when the target model includes Transformer and/or Transformer-XL, the interaction module is further configured to determine a fine-tuning model according to a user operation.

Optionally, the fine-tuning model includes at least one of the following: CNN, RNN, GRU, or LSTM.

According to the fourth aspect of the embodiments of the present disclosure, a computer readable storage medium storing a computer program is provided, where the program is executed by a processor to implement the steps in the method for training a natural language processing model and/or the text processing method described above.

According to the embodiments of the present disclosure, the sample text may be processed based on the triple in the sample text to obtain a knowledge fusion vector. Compared with the sample text, the knowledge fusion vector contains other triple information (such as entity information in the text and relation information between the entities) besides the sample text information itself, so that a computer obtains the true meaning of the sample text more accurately. Therefore, the target model obtained by training the NLP model based on the knowledge fusion vector has a better effect on NLP.

BRIEF DESCRIPTION OF DRAWINGS

The accompanying drawings herein are incorporated in and constitute a part of this description, illustrate embodiments consistent with the present disclosure, and together with the description serve to explain the principles of the present disclosure.

DETAILED DESCRIPTION

The following clearly and completely describes the technical solutions in the embodiments of the present disclosure with reference to the accompanying drawings in the embodiments of the present disclosure. Apparently, the described embodiments are some of the embodiments of the present disclosure rather than all of them. All other embodiments obtained by a person of ordinary skill in the art based on the embodiments of the present disclosure without creative efforts shall fall within the protection scope of the present disclosure.

The terms used in the present disclosure are for the purpose of describing a particular example only, and are not intended to limit the present disclosure. The singular forms such as "a", "said", and "the" used in the present disclosure and the appended claims are also intended to include a plural form, unless the context clearly indicates otherwise. It should also be understood that the term "and/or" used herein includes any and all possible combinations of one or more of the associated listed items.

It is to be understood that although different information may be described using the terms such as "first", "second", "third", etc. in the present disclosure, the information should not be limited to these terms. These terms are only used to distinguish information of the same category with each other. For example, the first feature extraction layer may also be referred to as the second feature extraction layer without departing from the scope of the present disclosure, and similarly, the second feature extraction layer may further be referred to as the first feature extraction layer. Depending on the context, the word "if" as used herein may be interpreted as "when" or "upon" or "in response to determining".

For the purpose of simplicity and ease of understanding, the terms used in this article are "greater than" or "less than", or "higher than" or "lower than" when characterizing size relationships. But for those skilled in the art, it can be understood that, the term "greater than" also covers the meaning of "greater than or equal to", and "less than" further covers the meaning of "less than or equal to"; the term "higher than" covers the meaning of "higher than or equal to", and "lower than" further covers the meaning of "lower than or equal to".

Figure 1:
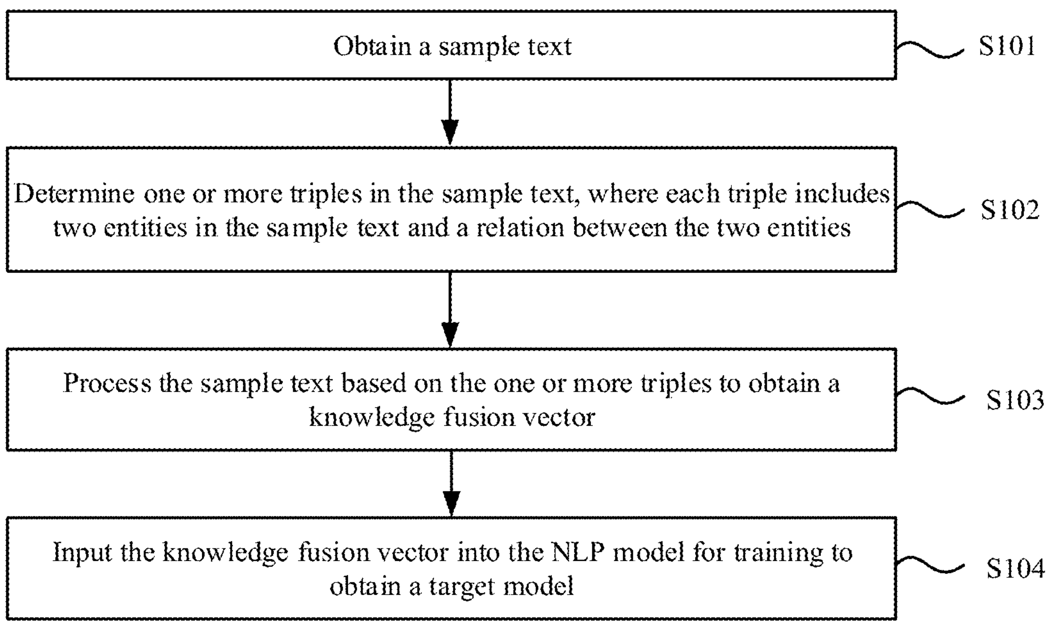
FIG. 1 is a flowchart of a method for training an NLP model according to an embodiment of the present disclosure.

FIG. 1 is a flowchart of a method for training an NLP model according to an embodiment of the present disclosure. The method for training an NLP model illustrated in this embodiment may be applied to terminals or may be applied to servers. The terminals include but are not limited to electronic devices such as mobile phones, tablet computers, wearable devices, personal computers, etc. The servers include but are not limited to local servers, cloud servers, etc.

As illustrated in FIG. 1, the method for training an NLP model may include the following steps: in step S101, obtaining a sample text; in step S102, determining a triple in the sample text, where the triple includes two entities in the sample text and a relation between the two entities; in step S103, processing the sample text based on the triple to obtain a knowledge fusion vector; and in step S104, inputting the knowledge fusion vector into the NLP model for training to obtain a target model.

The NLP model includes at least one feature extraction layer, and the feature extraction layer is configured to: perform a linear transformation on the knowledge fusion vector, to obtain at least two knowledge fusion matrices including a first knowledge fusion matrix and a second knowledge fusion matrix; determine an association matrix according to the first knowledge fusion matrix, where the association matrix represents association relation between at least one entity in the sample text and tokens in the sample text; and determine a weight matrix according to the second knowledge fusion matrix and the association matrix, where the weight matrix represents weight between the at least one entity and the sample text.

It should be noted that, the "entity" in the embodiments of the present disclosure refers to something that is distinguishable and exists independently. For example, it may be a certain person, a certain city, a certain kind of plant, a certain kind of commodity, etc. Everything in the world is composed of specific objects, which refers to entities, such as "United States", "United Kingdom", etc. The entities may exist in a knowledge graph, for example, as the most basic elements in the knowledge graph, or they may exist outside a knowledge graph, and different relations may exist between different entities. The "relation" in the embodiments of the present disclosure refers to the association between different entities. For example, the relation between London and the United Kingdom is capital. The "relation" may also refer to attributes, such as the age, height, and weight attributes of a certain person.

As for the "knowledge graph" appearing in subsequent embodiments, it is intended to describe various entities or concepts and their relationships that exist in the real world. The knowledge graph constitutes a huge semantic network graph. The nodes represent the entities or the concepts, and the edges are composed of the attributes or the relations. The current knowledge graph has been used to generally refer to various large-scale knowledge bases.

In an embodiment, the triple may include two entities and a relation between the two entities, and the two entities may include ahead entity and a tail entity. For example, the sample text is "Levis is a civil servant of country A", in which the head entity includes "Levis", the tail entity includes "a civil servant of country A", and the relation includes "job". It should be noted that, the relation in the triple described in the embodiment of the present disclosure may include the relation itself, and may further include the attributes of the entity. The embodiment of the present disclosure mainly provides examples in the case where the relation only includes the relation itself.

It may be seen that the entities in the triple exist in the sample text, while the relations in the triple may not exist in the sample text. Of course, this is just an example. In some cases, the relations may also exist in the sample text.

In an embodiment, not only one triple but also a plurality of triples may exist in a sample text. Regarding the case where there is one triple or a plurality of triples in the sample text, the sample text includes at least one of the following: a sentence, a plurality of sentences, a paragraph, and an article. The following examples mainly focus on the case where the sample text includes one sentence.

For example, a sample text is: After the “Tumu Incident”, the outstanding national hero Yu Qian of the Ming Dynasty was made.

It may be determined that in the sample text, the head entity SUBJ includes “Yu Qian”, the tail entity OBJ includes “Ming Dynasty”, and the relation includes “Dynasty”.

In this sample text, there is only one triple [[“Yu Qian”, “Dynasty”, “Ming Dynasty” ]].

For example, a sample text is: Song Yingxing was born in Fengxin, Jiangxi Province, in 1587 AD, who experienced the final period of the Ming Dynasty from corruption to downfall thereof.

It may be determined that in the sample text, the head entity SUBJ includes “Song Yingxing”, the tail entity OBJ includes “Fengxin, Jiangxi Province” and “1587”, and the relation includes “Birth location” and “Birth time”.

Then in this sample text, there are two triples, one is [[“Song Yingxing”, “Birth location”, “Fengxin, Jiangxi Province” ]], and the other is [[“Song Yingxing”, “Birth time”, “1587” ]].

In addition, the language of the sample text includes but is not limited to Chinese, and may also be a foreign language, such as English, then the language of a triple in the sample text may further be English.

According to embodiments of the present disclosure, the sample text may be processed based on the triple in the sample text to obtain the knowledge fusion vector, since the triple in the sample text on the one hand includes the original features of the entities in the triple in the sample text, and on the other hand, further includes the features of the relations in the triple, the obtained knowledge fusion vector may further include the features of the relations in the triple. Where, the extraction of the entities may mine the core meaning of the sample text, and further, the relations may comprehensively reflect the relations between the entities in the sample text. Therefore, through feature extraction of the entities and/or the relations, the model may be enabled to better obtain parameters that reflect the meaning of the sample text in the subsequent model training. Thus, compared with the sample text, the knowledge fusion vector contains other triple information besides the sample text information itself, e.g., entity information in the text and relation information between the entities, so that a computer is enabled to obtain the true meaning of the sample text more accurately, so that the target model obtained by training the NLP model based on the knowledge fusion vector has a better effect on NLP.

In an embodiment, the NLP model includes but is not limited to any one of the following models: a self-attention mechanism model, a multi-layer perceptron model, a recurrent neural network model, a convolutional neural network, a deep convolutional neural network, and a self-attention transformer.

In an embodiment, the method of determining the triple in the sample text may include: determining the triple corresponding to the sample text in a knowledge graph (KG), or obtaining the triple in the sample text based on a triple extraction model (e.g., the triple extraction model in a subsequent embodiment).

In an embodiment, there are multiple methods of determining the triple in the sample text. For example, a triple extraction model may be first determined, and then the triple in the sample text are directly obtained based on the triple extraction model; or combined with the knowledge graph, the triple may be determined, for example, the head entities and the tail entities of the sample text are determined, and then the corresponding relations between the head entities and tail entities in the knowledge graph are determined.

Since the knowledge graph contains clear entities and relations between the entities, the triple corresponding to the sample text in the knowledge graph may be determined. For example, after determining a head entity and a tail entity in the triple in the sample text, the relation between the head entity and the tail entity may be determined in the knowledge graph according to the determined head entity and tail entity, which is beneficial to accurately determine the relation in the triple.

It should be noted that, even if the relation in the triple exists in the sample text, since the sample text is an independent text and has no connection with other texts, the relations between the entities determined based on the sample text may still be not comprehensive, while a knowledge graph contains a large number of entities and constructs a large number of relations between the entities, so determining the relations based on the knowledge graph is more comprehensive and accurate.

In an embodiment, determining the triple corresponding to the sample text in the knowledge graph includes: determining the field to which the sample text belongs; determining the knowledge graph of the field; determining the triple corresponding to the sample text in the knowledge graph of the field.

In an embodiment, since the same entity may express different meanings in different fields, which leads to very different relations between the same entity and other entities in the knowledge graphs of different fields. For example, the entity “apple” generally refers to a kind of fruit in the agricultural field, so in the knowledge map of the agricultural field, “apple” generally has relations with other fruits; and in the communication field, it generally refers to a mobile phone, so in the knowledge graph in the communication field, “Apple” generally has relations with other mobile phones. Thus, if a triple is determined based on the knowledge graph without distinguishing between fields, the determined triple is likely to be inaccurate.

In this embodiment, the field to which the sample text belongs may be determined first, then the knowledge graph of the field is determined, and finally the corresponding triple of the sample text in the knowledge graph of the field is determined. For example, if the sample text belongs to the agricultural field, then the corresponding triple of the sample text in the knowledge graph of the agricultural field is determined; for example, if the sample text belongs to the communication field, then determine the corresponding triple of the sample text in the knowledge graph of the communication field. Accordingly, it is helpful to ensure the accuracy of the determined triple.

In an embodiment, the knowledge graph includes at least one of the following: a pre-constructed knowledge graph and a pre-stored knowledge graph.

The knowledge graph adopted in this embodiment may be a pre-stored knowledge graph, such as an existing knowledge graph, or a pre-constructed knowledge graph. How to construct the knowledge graph is described below through several embodiments.

In an embodiment, in the case that the knowledge graph includes a pre-constructed knowledge graph, before determining the triple corresponding to the sample text in the knowledge graph, the method further includes: constructing the knowledge graph. According to this embodiment, the knowledge graph may independently constructed as needed, which is helpful to ensure that the knowledge graph where the triple is located meets the needs.

In an embodiment, the method of constructing the knowledge graph may include determining a triple extraction model, where the triple extraction model is configured to extract triples from the sample text, and constructing the knowledge graph according to the extracted triples.

In an embodiment, since the main content contained in the knowledge graph is triples, in order to construct the knowledge graph, according to this embodiment, a triple extraction model may be determined first, and then the triples are extracted in a large number of the sample texts through the triple extraction model, which is conducive to improving the efficiency of extracting the triples, thereby constructing the knowledge graph based on the extracted triples.

Figure 2:
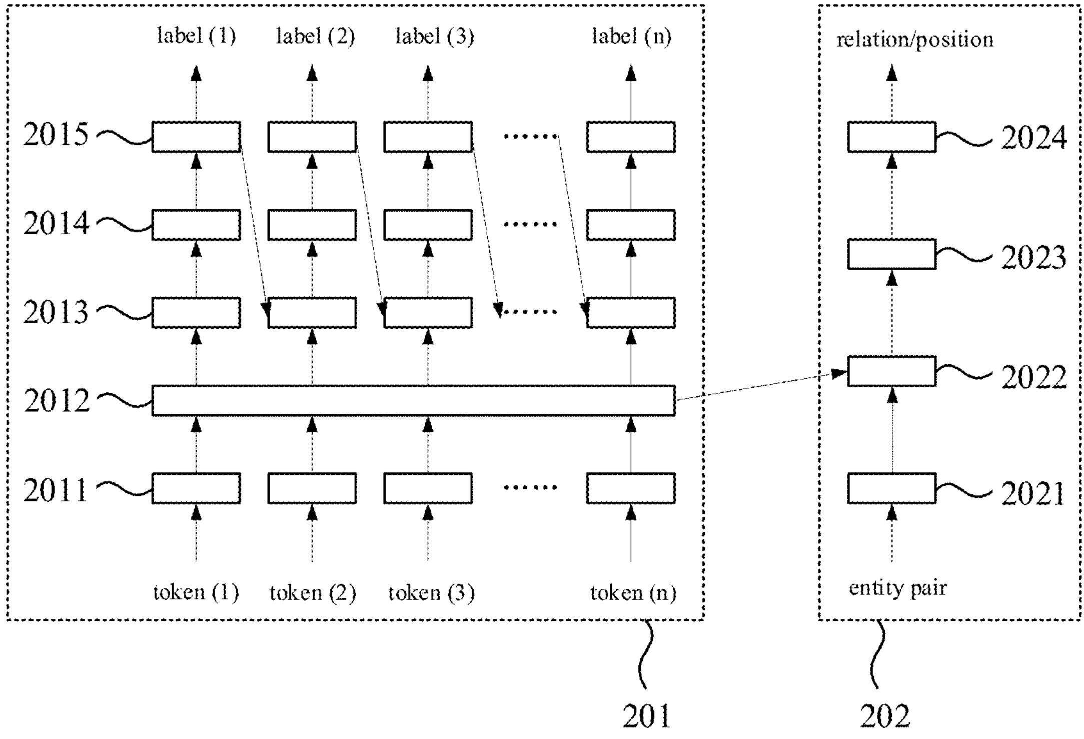
FIG. 2 is a schematic diagram of a triple extraction model according to an embodiment of the present disclosure.

FIG. 2 is a schematic diagram of a triple extraction model according to an embodiment of the present disclosure. As illustrated in FIG. 2, the triple extraction model includes: a label determination model 201, which is configured to determine the labels of the tokens (the division granularity may be character, or may be word, which may specifically be selected as needed) in the sample text; where, the label is used to determine the entity in the sample text; a relation determination model 202, which is configured to determine a relation between at least two entities (e.g., which may be referred to as an entity pair (Span Entity)) determined by the label determination model and/or determine the position of the relation in the sample text.

In an embodiment, the most basic element in the sample text may be a token, so the entity in the triple in the sample text may be determined at the granularity of tokens. In order to determine which tokens may be used as the entities in the triple, it may be implemented based on the labelling method, for example, based on the BILOU (beginning, inside, outside, last, unit) labelling method, by labelling the tokens in the sample text (the division granularity may be character, or may be word, which may specifically be selected as needed) through the labels B, I, L, O, and U, and then the entities in the sample text may be determined based on the labels. The label B represents the beginning of the entity, and the label I represents the middle of the entity, the label L represents the end of the entity, the label O represents the non-entity token, and the label U represents the entity of a single word. Then a plurality of tokens in the sample text sequentially (e.g., may be further consecutively) corresponding to the labels B, I, L may be determined as the entities.

Thus, in order to accurately determine the label of each token in the sample text, according to this embodiment, a label determination model configured to determine the labels of the tokens in the sample text is constructed first, and then based on the labels of the tokens, the entities in the sample text may be determined.

However, based on the above embodiments, it may be seen that the entities in the triple are generally located in the sample text, while the relation in the triple may not be located in the sample text, moreover, even if the relation in the triple is located in the sample text, it is necessary to accurately determine the position of the relation in the sample text, so that the relation in the triple may be accurately determined in the sample text.

Thus, in order to determine the relation in the triple and/or the position of the relation in the sample text, according to this embodiment, a relation determination model is further constructed, which may be configured to determine the relation between two entities in an entity pair and/or the position of the relation in the sample text.

Accordingly, a triple may be accurately extracted from the sample text through the triple extraction model. Specifically, the entities in the triple may be extracted from the sample text through the label determination model in the triple extraction model, and the relation in the triple may be extracted from the sample text through the relation determination model in the triple extraction model.

In an embodiment, as illustrated in FIG. 2, the label determination model 201 includes: a first encoding layer 2011, where the input of the first encoding layer includes the tokens; a feature extraction layer 2012, where the input of the feature extraction layer includes the output of the first encoding layer; a first activation layer 2013, where the input of the first activation layer includes the output of the feature extraction layer; a first normalization layer 2014, where the input of the first normalization layer includes the output of the first activation layer; a first output layer 2015, where the input of the first output layer includes the output of the first normalization layer, and the first output layer is configured to output the label.

In an embodiment, as illustrated in FIG. 2, the sample text may be divided into a plurality of tokens and then input into the first encoding layer, the first encoding layer may be configured to determine the embedding vector of the tokens; optionally, the first encoding layer may include a Bert model and/or a word2vec model, the Bert model and/or the word2vec model may perform feature extraction on an entire sentence of the sample text to obtain the embedding vector of the tokens.

The output of the first encoding layer may be input into a feature extraction layer, the feature extraction layer may include, for example, a bidirectional long short-term memory (Bi-LSTM) model configured to extract features embedded in the vector, and the feature extraction layer is on the basis including the Bi-LSTM model.

The output of the feature extraction layer may be input into the first activation layer, which may include, for example, a Tanh layer; the output of the first activation layer may be input into the first normalization layer, which may include, for example, a softmax layer; the output of the first normalization layer may be input into the first output layer, and the first output layer finally outputs the labels corresponding to the tokens.

Through the label determination model, the label corresponding to each token in the sample text may be determined. For example, for a sample text containing n tokens, the label of token (1) may be determined as label(1), the label of token (2) may be determined as label (2), . . . the label of token (n) may be determined as label (n).

In an embodiment, as illustrated in FIG. 2, the input in the first activation layer corresponding to the (i+1)th token in the sample text further includes the output in the first output layer corresponding to the i-th token in the sample text, and i is an integer greater than or equal to 1.

In an embodiment, if the first activation layer, the first normalization layer, and the first output layer process each token independently, then although the label of each token may be obtained, due to the lack of consideration of the relations between tokens, the obtained label accuracy may not be very high. Thus, according to this embodiment, the output of the i-th token in the first output layer is used as the input of the (i+1)th token in the first activation layer, so that when determining the label of the (i+1)th token, taking the label of the i-th token into consideration may help ensure that the determined tokens satisfies the relations between the tokens, thereby improving the accuracy of determining labels.

In an embodiment, as illustrated in FIG. 2, the relation determination model 202 includes: a second encoding layer 2021, where the input of the second encoding layer includes the entity pair; a fully connected layer 2022, where the input of the fully connected layer includes the output of the second coding layer; a second activation layer 2023, where the input of the second activation layer includes the output of the fully connected layer; a second normalization layer 2024, where the input of the second normalization layer includes the output of the second activation layer, and the second normalization layer 2024 is configured to output the relation and/or the position of the relation in the sample text.

In an embodiment, after determining the labels corresponding to the tokens in the sample text, the entities belonging to the triple in the sample text may be further determined based on the labels. After the entities are determined, each two entities may be formed into an entity pair, which is used as the input of the relation determination model.

For example, the entity pair may be input into the second encoding layer first, and the second encoding layer may determine the embedding vector of the entity pair; the output of the second coding layer may be used as the input of the fully connected layer; the output of the fully connected layer may be input into the second activation layer, and the second activation layer may include, for example, a Tanh layer; the output of the second activation layer may be input into the second normalization layer, and the second normalization layer may include, for example, a softmax layer.

Through the relation determination model, the relation between the entity pair may be determined for the entity pair input into the model. When the relation exists in the sample text, the position of the relation in the sample text may be further determined, and then the token of the position may be extracted as the relation. Accordingly, the extraction of the triple may be completed.

In an embodiment, as illustrated in FIG. 2, the input of the fully connected layer further includes the output of the feature extraction layer. Since the relation is determined solely based on the entity pairs, there is a lack of consideration of the contextual relations between the entity pairs in the sample text, so the accuracy of the determined relation and/or the position of the relation may not be relatively high.

Therefore, according to this embodiment, the output of the feature extraction layer in the label determination model is used as the input of the fully connected layer in the relation determination model. Since the output of the feature extraction layer may well represent the contextual relations between the entities in the entity pair in the sample text, the relation determination model may also consider the contextual relations between the entities in the entity pair in the sample text when determining the relation and/or the position of the relation, which helps ensure the accuracy of determining the relation and/or position of the relation.

In an embodiment, the method of determining the triple corresponding to the sample text in the knowledge graph may include: determining a plurality of knowledge subgraphs; merging the entities with the same semantics in different knowledge subgraphs to obtain the merged knowledge graph; and determining the triple corresponding to the sample text in the merged knowledge graph.

In an embodiment, since the same entity may be represented by different tokens in different knowledge graphs, for example, the entity “pineapple” may also be represented by “ananas”. In this case, in different knowledge graphs, the triple where the entity “pineapple” is may be slightly different from the triple where the entity “ananas” is. Therefore, by merging different entities with the same semantics in different knowledge graphs, on the one hand, redundancy may be avoided when the entities with the same meaning are expressed through different tokens, on the other hand, the triple where the entities are located may be expanded, thereby ensuring the comprehensiveness of the knowledge graph. For convenience of description, the knowledge graphs that need to be merged are called knowledge subgraphs.

For example, in the knowledge subgraph KG1, there exists the entity “pineapple”, and the corresponding triple includes [[“pineapple”, “type”, “fruit” ]]; while in the knowledge subgraph KG2, there exists the entity “ananas”, and the corresponding triple includes [[“ananas”, “type”, “fruit” ]].

Essentially, the meanings expressed by these two triples are the same, but since the head entities are represented by different tokens with the same semantics, there exists a certain degree of redundancy. This may lead to that, different triples are determined for the tokens corresponding to the two entities “pineapple” and “ananas”, or even in some cases, a triple can only be determined for one of the two entities.

According to this embodiment, the entities with the same semantics in different knowledge subgraphs may be merged to obtain a merged knowledge graph. For example, the two entities “pineapple” and “ananas” in the above KG1 and KG2 are merged, and subsequently the triple corresponding to the sample text in the merged knowledge graph may be determined, then no matter whether the word appearing in the sample text is “pineapple” or “ananas”, the same triple may be successfully determined in the merged knowledge graph.

In an embodiment, at least one pre-training task may be constructed, and the NLP model is trained according to the at least one pre-training task to obtain the target model.

In an embodiment, the actual applied model may be called an overall model, and the overall model may include the target model, and may further include a fine-tuning model, where the target model may be obtained in the pre-training task stage, and the fine-tuning model may be obtained during the subsequent fine-tuning stage.

In the pre-training stage, the embedding vector obtained based on the sample text may be input into the NLP model, and the NLP model is trained according to the constructed pre-training task. According to the difference between the output of the NLP model and the correct result corresponding to the input of the training stage and/or the pre-training task, the parameters of the NLP model may be adjusted, so that the difference between the processing result of the NLP model and the corresponding correct result becomes less and less, and finally falls within a certain threshold, then it may be considered that the training of the NLP model based on the pre-training task is completed.

When there are a plurality of pre-training tasks, the NLP model may be trained one by one according to each of the pre-training tasks, or the NLP model may be trained through a plurality of pre-training tasks together, which may specifically be selected as needed. In the pre-training stage, the target model may be obtained after training the NLP model, which may be stripped out. The trained target model may provide features for different downstream tasks, or the fine-tuning of other downstream tasks may be performed directly on the trained target model.

In another embodiment, the target model obtained from the pre-training tasks may also be used as the model for actual application.

The following embodiments describe the pre-training task stage first, and the subsequent embodiments describe the fine-tuning stage.

Training the NLP model may include training the NLP model based on pre-training tasks, the specific pre-training tasks may be set as needed, and the quantity of the pre-training tasks may further be set as needed, for example, the quantity may be one, or more.

In an embodiment, the at least one pre-training task includes: a first pre-training task, where the first pre-training task includes a masking task (mask), and the masking task includes masking the sample text based on the triple to obtain the knowledge fusion vector.

The masking task may be understood as masking one or more tokens (replacing the tokens with [mask]) in the sample text to obtain the initialized text vector, and then performing prediction training in the pre-training task, i.e., enabling the model to predict the masked tokens according to the unmasked tokens (context) to finally obtain the trained text vector, where the vector representation corresponding to the mask positions in the trained text vector fuses the meaning of the tokens and the context, which may more accurately represent the text meaning.

In an embodiment, the first pre-training task may be a task of masking the sample text based on the triples. It may be understood as, when masking the sample text, introducing triple information (triples), so as to perform more targeted masking processing to obtain the trained knowledge fusion vector more accurately. Masking the sample text based on the triples at least includes: masking all or part of the tokens corresponding to the triples in the sample text. The triples in the sample text are usually key information, and predicting the triples has better effect. The proportion of masked tokens among all tokens in the sample text may be set as needed, e.g., 10% to 20%. It may be set as 15%, if the proportion of the quantity of triples is greater than this proportion, only part of the triples may be selected to be masked; if the proportion of the quantity of the triples is less than this proportion, other tokens in the sample text may be masked at the same time.

In an embodiment, processing the sample text based on the triples to obtain a knowledge fusion vector may include: masking tokens in the sample text to obtain a knowledge fusion vector, and inputting the knowledge fusion vector into an NLP model for training to obtain the target model, which may include training the NLP model to predict the masked tokens, and the trained target model may output the trained knowledge fusion vector. In this case, the obtained knowledge fusion vector may include the embedding vector of the tokens, and the embedding vector of the entire sample text may further be obtained.

For example, the tokens corresponding to the triples in the sample text may be masked to obtain the knowledge fusion vector, that is, after masking the tokens corresponding to the entities and/or the relations in the triples in the sample text, the masked tokens are predicted. In this case, the obtained knowledge fusion vector may include the embedding vector of the tokens corresponding to the triples, and may further include the embedding vector corresponding to the tokens outside the triples, and the embedding vector of the entire sample text may further be obtained.

The target model trained based on the first pre-training task may at least be configured to output the embedding vector of the masked tokens, and may further output the embedding vector of the unmasked tokens, and the embedding vector of the entire sample text may further be obtained.

In an embodiment, the tokens corresponding to the triples in the sample text may be masked to obtain the knowledge fusion vector. The tokens of the triples may be tokens corresponding to the entities, or may be tokens corresponding to the relations, or may be tokens corresponding to the entities and the relations.

In an embodiment, the tokens corresponding to the entities and the relations in the triples in the sample text may be masked to obtain the knowledge fusion vector.

Masking the tokens corresponding to the triples in the sample text to obtain the knowledge fusion vector may include masking only the tokens corresponding to the entities in the triples in the sample text to obtain the knowledge fusion vector, then the embedding vector corresponding to the entities may be obtained, or may include masking the tokens corresponding to the entities and the relations in the triples in the sample text to obtain the knowledge fusion vector, then the embedding vector of the entities and the embedding vector of the relations may be obtained, or the embedding vector of the entire triples may be obtained.

Specifically, whether masking the entities in the triples to obtain the knowledge fusion vector, or masking the entities and the relations in the triples to obtain the knowledge fusion vector, may be selected as needed.

In an embodiment, the tokens corresponding to the triples may be masked in the sample text according to a first probability (which may be less than 100%) to obtain the knowledge fusion vector.

In an embodiment, the tokens not corresponding to the triples may be masked in the sample text according to a second probability to obtain the knowledge fusion vector.

In an embodiment, the first probability is greater than the second probability.

In an embodiment, the first probability is from 60% to 80%, for example, set to 80%, and/or the second probability is from 20% to 40%, for example, set to 20%, and the sum of the first probability and the second probability is 100%.

In the present disclosure, the tokens corresponding to the triples in the sample text may be masked according to the first probability to obtain the knowledge fusion vector, and the tokens not corresponding to the triples in the sample text may further be masked according to the second probability to obtain the knowledge fusion vector. For example, the first probability is 80%, then there is an 80% probability that the tokens that needs to be masked are the tokens corresponding to the triples, and the probability of selecting the tokens not corresponding to the triples is 20%. Accordingly, it may be ensured that the obtained target model after training may accurately predict the tokens corresponding to the triples and may accurately predict the tokens not corresponding to the triples.

It should be noted that, when masking the tokens corresponding to the triples in the sample text, if masking is performed with a 100% probability, that is, the masked tokens are cut out and the [mask] marks are used to replace the original words, so as for the NLP model to correctly predict the cut out words. Then there may be a problem that: a lot of [mask] marks are seen during the training process, but the marks do not exist in the text during actual usage.

This will lead the NLP model to think that the output is for the [mask] marks, but in actual use, the marks cannot be seen, so it will cause some problems.

In order to avoid the problem, in this embodiment, for selected tokens that need to be masked, masking may be performed according to a preset proportion. For other tokens that need to be masked, part of them may be randomly replaced with another token, and the other part of them may be remain unchanged. For example, masking is performed with an 80% probability, that is, when the tokens that need to be masked are selected, there is only an 80% probability that they are actually to be replaced with the [mask] marks. Other tokens that need to be masked may be randomly replaced with another token with a 10% probability, and remain unchanged with a 10% probability.

In an embodiment, the at least one pre-training task further includes: a second pre-training task, where the second pre-training task is used to split the sample document containing the sample text into segments and then perform rearrange training.

The target model trained based on the second pre-training task may be configured to determine a distance between the sample text and other texts, and then determine the relation between the sample text and other texts according to the predicted distance, for example, it may be predicted that whether the sample text and other texts belong to the same document and whether they have an adjacent relation in the same document.

In an embodiment, splitting the sample document containing the sample text into segments and then performing rearrange training includes: splitting the sample document into segments step by step according to at least one level of granularity, after each level of splitting, randomly shuffling the obtained segments through splitting, and combining the rearranged sample; and performing training based on the rearranged sample to output the relation type between the sentences in the rearranged sample.

In an embodiment, the relation type includes at least one of the following: belonging to the same document and adjacent; belonging to the same document but not adjacent; belonging to different documents.

For example, taking two-level granularity as an example, for the sample document where the sample text is located, the sample document may be split into a plurality of segments at the first granularity (such as paragraphs), for example, into three segments [C1, C2, C3], and the order of the segments is randomly shuffled, for example, the shuffled order is [C2, C1, C3], and then training is performed to restore the correct order; then [C1, C2, C3] may further be split at the second granularity (such as sentences) into smaller segments, the second granularity is smaller than the first granularity, for example, into [S0, S1, S2, . . . , Sn], and the order of the segments is randomly shuffled, for example, the shuffled order is [S2, S9, Sn, . . . , S3], and then training is performed to restore the correct order.

Specifically, the distance between segments may be learned through document-level information. The task may be a 3-classification problem. For example, the output 0 indicates that the two segments belonging to the same document and are adjacent; the output 1 indicates that the two segments belonging to the same document and are not adjacent; the output 2 indicates that the two segments belonging to different documents.

It should be noted that, the granularity of splitting documents for rearrange is not limited to the above two levels of granularity. It may further include a larger granularity or a smaller granularity. Taking the smaller granularity as an example, a sentence of sample text may be split through triples into a plurality of segments, then the order of the divided segments is shuffled for rearrange training to restore the correct order. The method of splitting the sample text according to triples includes but is not limited to the method of the above embodiments, which will not be described again here.

In an embodiment, the at least one pre-training task further includes: a third pre-training task, where the third pre-training task is configured to perform semantic recognition training on the sample text.

The target model trained based on the third pre-training task may be configured to identify the semantics of the sample text. In the embodiments of the present disclosure, the semantic identification training of the third pre-training task may include training the relation between two sentences in the sample text. It may be understood that the training is to learn the possible causal, progressive, transitional and other logical relations between two sentences by identifying words such as "because", "further", "but", etc. In another embodiment, the semantic identification training of the third pre-training task may be the degree of correlation between a query and a text topic in the sample text. It may be understood that, the task may be a multi-classification task, for example, the output 0 indicates a strong correlation, i.e., the user continues to click on the text title in the sample text after inputting the query; the output 1 indicates a weak correlation, i.e., the user does not click on the text title in the sample text inputting the query; and the output 2 represents uncorrelated, i.e., the sample is randomly generated, the training sample may be data obtained through search engines.

It should be noted that, the at least one pre-training task may further include other pre-training tasks as needed in addition to the above first pre-training task, second pre-training task, and third pre-training task. The pre-training task may be a supervised task or an unsupervised task, which may be set according to the actual task situation, and the NLP model may be trained based on one or more pre-training tasks, and when a plurality of pre-training tasks are used for training, the obtained target model may have a plurality of functions to better improve the performance of the target model.

Figures 3, 4:
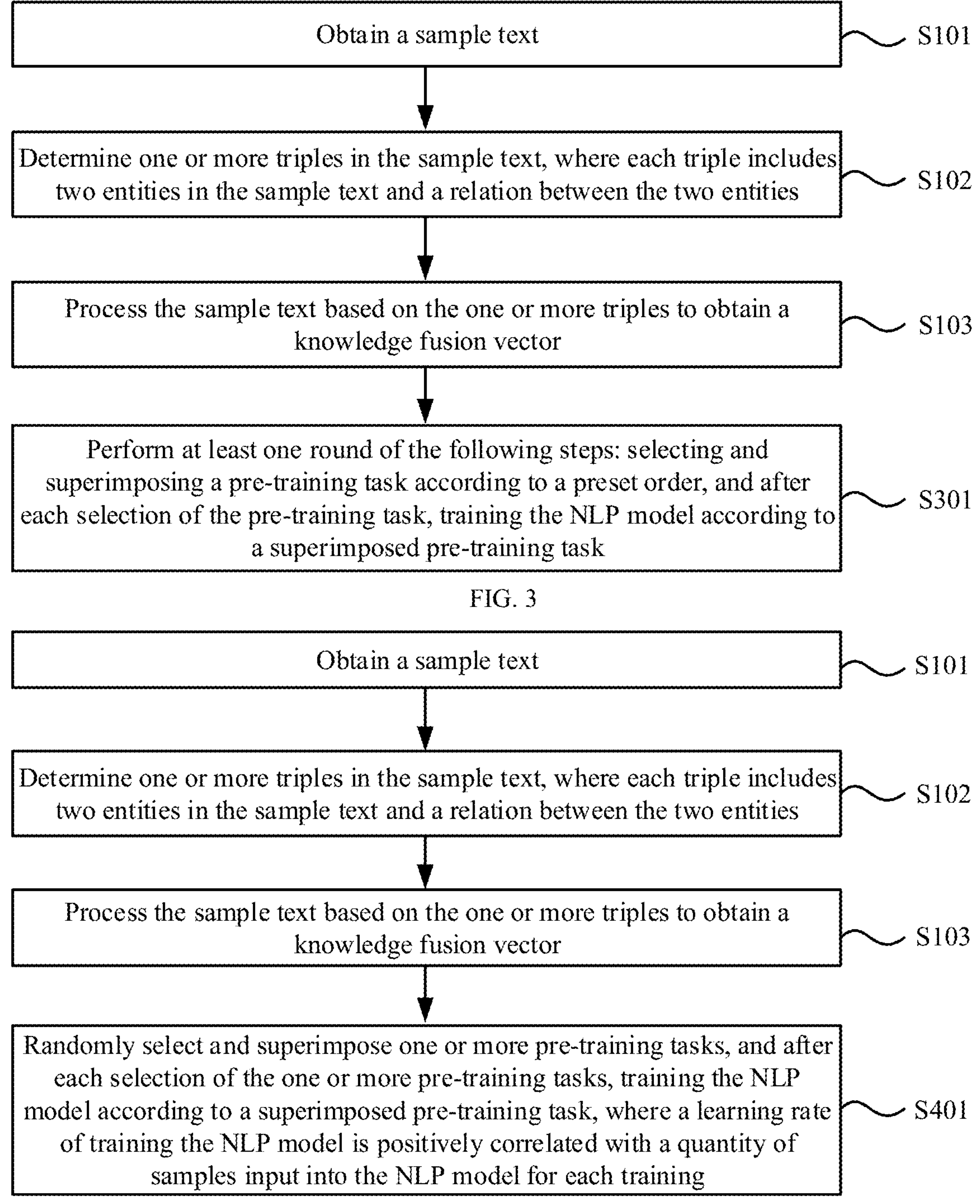
FIG. 3 is a flowchart of another method for training an NLP model according to an embodiment of the present disclosure.
FIG. 4 is a flowchart of another method for training an NLP model according to an embodiment of the present disclosure.

FIG. 3 is a flowchart of another method for training an NLP model according to an embodiment of the present disclosure. As illustrated in FIG. 3, in the pre-training stage, the method further includes: in step S301, performing at least one round of the following steps: selecting and superimposing a pre-training task according to a preset order, and upon completing pre-training task selection each time, training the NLP model according to a superimposed pre-training task.

In an embodiment, the order of each pre-training task may be preset. For example, as mentioned above, there are the pre-training task Task1, the second pre-training task Task2, and the third pre-training task Task3, and the order of the three pre-training tasks are, from first to last, Task1, Task2, and Task3.

Then Task1 may be first selected to train the NLP model; then Task2 is selected and superimposed on Task1, and through the two pre-training tasks Task1 and Task2 together, training is continued to be performed on the NLP model after the previous training; then Task3 is selected and superimposed on Task2 and Task1, and through the three pre-training tasks Task1, Task2, and Task3 together, the NLP model after the previous training is continued to be trained, training is continued to be performed on the NLP model after the previous training.

The superimposition refers to superimposing the loss functions corresponding to the pre-training tasks used in training together to form a comprehensive loss function for training.

The comprehensive loss function may be obtained by superimposing the loss function corresponding to each pre-training task, or by averaging the loss function corresponding to each pre-training task, or by weighting and summing the loss function corresponding to each pre-training task, which is not limited in the embodiments of the present disclosure.

At this point, a round of training is completed. The quantity of training rounds may be set as needed, or may be determined according to a set cutoff condition (e.g., the training results converge to a specified degree).

During each round of training, the quantity of times of training based on each superimposed pre-training task may be flexibly adjusted. For example, training may be performed once based on each superimposed pre-training task, for example, training is performed once based on Task1, and then training is performed once based on two pre-training tasks Task1 and Task2 that are superimposed together, and then training is performed once based on three pre-training tasks Task1, Task2, and Task3 that are superimposed together; or training may be performed a plurality of times based on each superimposed pre-training task, for example, training is performed twice based on Task1, and then training is performed three times based on two pre-training tasks Task1 and Task2 that are superimposed together, and then training is performed four times based on the three pre-training tasks Task1, Task2, and Task3 that are superimposed together.

FIG. 4 is a flowchart of another method for training an NLP model according to an embodiment of the present disclosure. As illustrated in FIG. 4, in the pre-training stage, the method further includes: in step S401, randomly selecting and superimposing one or more pre-training tasks, and upon completing pre-training task selection each time, training the NLP model according to a superimposed pre-training task, where a learning rate of training the NLP model is positively correlated with a quantity of samples input into the NLP model for each training.

In an embodiment, the order of each pre-training task may be preset. For example, as mentioned above, there are the pre-training task Task1, the second pre-training task Task2, and the third pre-training task Task3, and the order of the three pre-training tasks are, from first to last, Task1, Task2, and Task3.

Then the pre-training tasks may be randomly selected from these three pre-training tasks, where the quantity of pre-training tasks randomly selected each time may be preset, or may be random.

For example, the quantity of randomly selected pre-training tasks is preset to increase one by one each time. For example, Task2 is randomly selected from three pre-training tasks, and the NLP model is trained through Task2 first; then Task2 and Task3 are randomly selected, and through the two pre-training tasks Task2 and Task3 together, training continues to be performed on the NLP model after the previous training; lastly, Task3, Task1 and Task2 are randomly selected, then, through the three pre-training tasks Task1, Task2 and Task3 together, training continues to be performed on the NLP model after the previous training. The one or more pre-training tasks randomly selected each time may include the pre-training tasks that have been selected, or may not include the pre-training tasks that have been selected. Specifically, random selection rules may be set as needed. Training may be stopped when the training results reach a convergence condition.

Regarding the embodiments illustrated in FIG. 3 and FIG. 4, selecting training tasks in sequence for training, or randomly selecting training tasks for training may be selected as needed. In addition, a priority selection with a certain probability may further be made based on the importance of each pre-training task.

In an embodiment, the relationship between the learning rate of training the NLP model and the quantity of samples input into the NLP model for each training is as follows: $Y=5.57e^{-6}\cdot\log_2 X-4.75e^{-6}$; where, X represents the quantity (batchsize) of samples input into the NLP model for each training, ranging from $24\le X\le 256$, and Y is the learning rate.

It should be noted that during the actual training process, the calculated Y value may be fine-tuned within the range of $[Y-1.0e^{-5}, Y+1.0e^{-5}]$. Training through the above relationship between the batchsize and the learning rate may enable the model training to converge faster. Usually, the value of X is to the nth power of 2, which is not limited in the present disclosure. For values of X which is not within the range [24,256], the above formula may also be referred for learning rate selection.

In an embodiment, the learning rate of training the natural language processing model is positively correlated with the quantity of the samples input into the NLP model for each training.

Figures 5, 6:
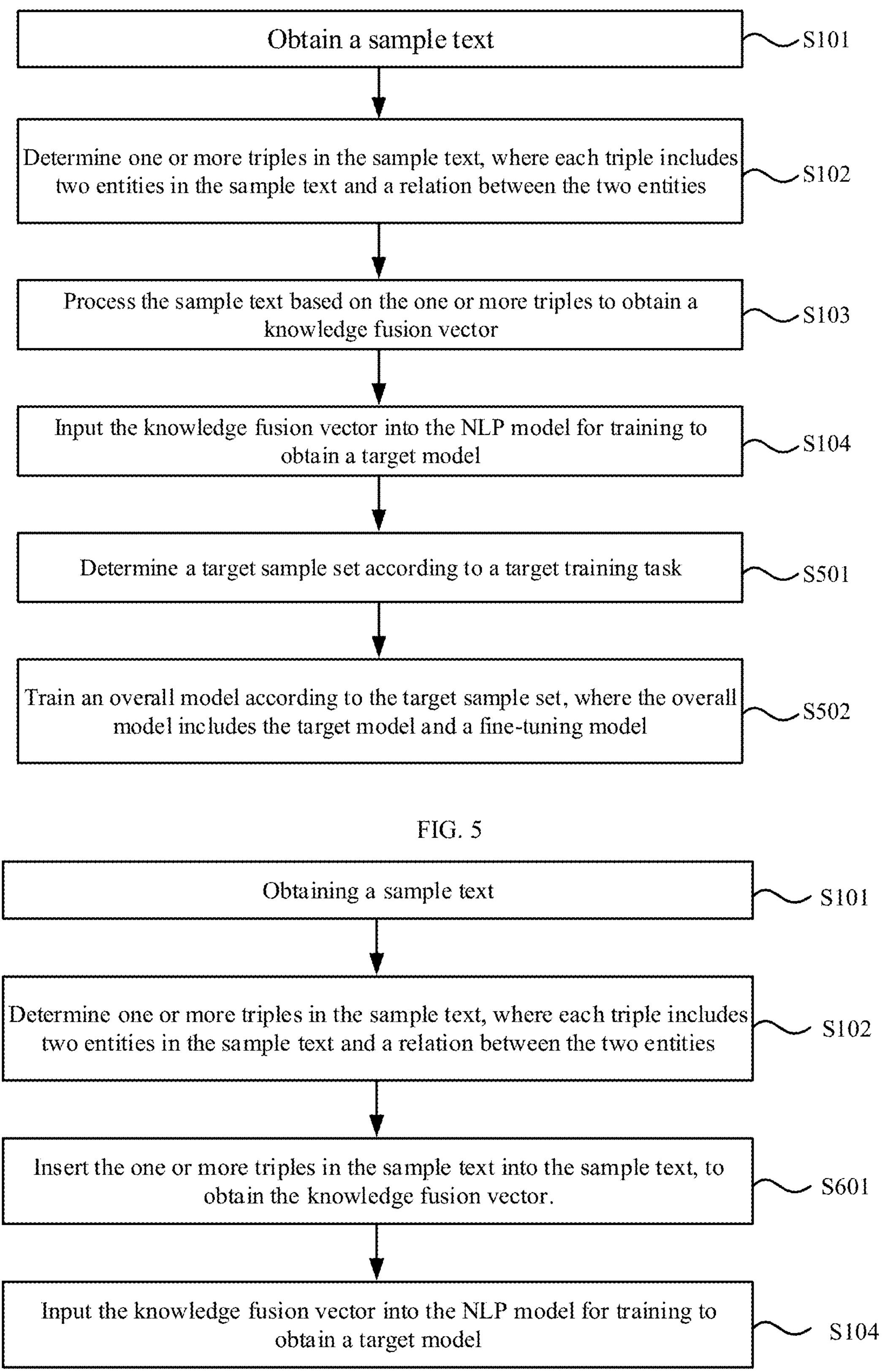
FIG. 5 is a flowchart of another method for training an NLP model according to an embodiment of the present disclosure.
FIG. 6 is a flowchart of another method for training an NLP model according to an embodiment of the present disclosure.

FIG. 5 is a flowchart of another method for training an NLP model according to an embodiment of the present disclosure. As illustrated in FIG. 5, the method further includes: in step S501, determining a target sample set according to a target training task; in step S502, training an overall model according to the target sample set, where the overall model includes the target model and the fine-tuning model.

In an embodiment, the target model obtained by training the NLP model through at least one pre-training task may be a pre-training model. Through a large number of corpora and multi-task learning, this pre-training model enables the target model to better learn general grammatical and semantic knowledge and form a general model with better generalization. After obtaining the target model, in this embodiment, a target training task (fine-tuning task) may be further constructed according to the specific application scenario. For the training samples of the target training task, according to the application scenario, a target sample set that is smaller than the pre-training sample set may be obtained. The training model of the fine-tuning task may be trained on the basis of the trained target model by adding the fine-tuning model as an overall model, so as to more accurately adapt to the needs of specific application scenarios. The training method of pre-training and fine-tuning is an application of transfer learning and has good scalability. Since the pre-trained model has good generalization ability, when training the model for new application scenarios, the parameters of the trained pre-training model may continue to be used for initialization, and the overall model is fine-tuned, which may result better training effects.

In an embodiment, the fine-tuning model includes at least one of the following: a convolutional neural network model (CNN); a recurrent neural network model (RNN); a gated recurrent unit model (GRU); a fully connected layer (FC); and a long short-term memory model (LSTM).

Regarding the embodiment illustrated in FIG. 1, the sample text is processed based on the triples to obtain the knowledge fusion vector, which mainly includes two embodiments. One embodiment is the aforementioned "masking the tokens corresponding to the entities in the triples in the sample text to obtain the knowledge fusion vector" to obtain the embedding vector of the tokens corresponding to the triples. Another embodiment is the fusion of the sample text and the triples.

Regarding these two embodiments, they may be implemented independently or in combination. For example, on the basis of "masking the tokens corresponding to the triples in the sample text to obtain the knowledge fusion vector" to obtain the embedding vector of the tokens corresponding to the triples, the sample text and the triple may further be fused to obtain the knowledge fusion vector, or the tokens corresponding to the triples may be masked during the fusion process of the sample text and the triples, which is not limited here. The following embodiments are exemplary description of the embodiment of processing the sample text based on the triples to obtain a knowledge fusion vector, including fusing the sample text and the triples to obtain a knowledge fusion vector.

FIG. 6 is a flowchart of another method for training an NLP model according to an embodiment of the present disclosure. As illustrated in FIG. 6, fusing the sample text and the triples in the sample text to obtain the knowledge fusion vector includes: in step S601, inserting the triples in the sample text into the sample text to obtain the knowledge fusion vector.

In an embodiment, the sample text and the triples in the sample text may be fused to obtain a knowledge fusion vector, and then the obtained knowledge fusion vector is used as a sample to form a sample set, and training is performed on the NLP model based on the training sample set, where the training tasks used for training may include one or more of the plurality of pre-training tasks described in the previous embodiments.

Since the knowledge fusion vector as a sample not only contain the features of the sample text, but also contain the features of the triples in the sample text, compared with the sample text, the knowledge fusion vector contains more features, which may more comprehensively reflect the relations between the entities in the sample text, so as to express the sample text more accurately. Accordingly, the target model trained on the NLP model based on the knowledge fusion vector has a better effect on NLP.

Regarding how to fuse the sample text and the triples in the sample text to obtain the knowledge fusion vector, the following embodiment mainly illustrates two fusion methods. One is inserting the triples in the sample text to obtain the knowledge fusion vector, the other is determining the text embedding vector corresponding to the sample text, determining the knowledge embedding vector corresponding to the triples, and then fusing the text embedding vector and the knowledge embedding vector to obtain the knowledge fusion vector. However, in specific applications, the fusion methods are not limited to these two, and may be selected as needs.

In an embodiment, fusing the sample text and the triples in the sample text to obtain the knowledge fusion vector may further include, for example, inserting the triples in the sample text into the sample text to obtain the knowledge fusion vector.

In an embodiment, the triples may be inserted in the sample text, for example, it may be inserted between the characters in the sample text, or it may be inserted after the last character of the sample text, or it may be inserted before the first character of the sample text. The insertion position of the triples in the sample text may be set as needed, or the insertion position of the triples in the sample text may be randomly determined.

In an embodiment, word embedding processing may be performed on the sample text with the inserted triples to obtain the knowledge fusion vector. The method for word embedding processing includes at least one of one-hot encoding, word2vec, vocabulary transformation, and other methods.

In an embodiment, the method of performing word embedding processing on the sample text with the inserted triples may further include multiplying the trainable weight after one-hot encoding to obtain a word embedding vector, or performing word2vec after multiplying the trainable weight after one-hot encoding to obtain a word embedding vector. It is not limited here in the present disclosure.

In an embodiment, the knowledge fusion vector may further include at least one of the following: a sentence embedding vector, a position embedding vector corresponding to the tokens, and a task type embedding vector.

It should be noted that when inserting a triple into the sample text, the triple may be inserted into the sample text as a whole, or the head entity, relation, and the tail entity in the triple may be inserted into the sample text as three parts respectively, for example, the three parts may be inserted into the sample text at different locations.

Figures 7, 8:
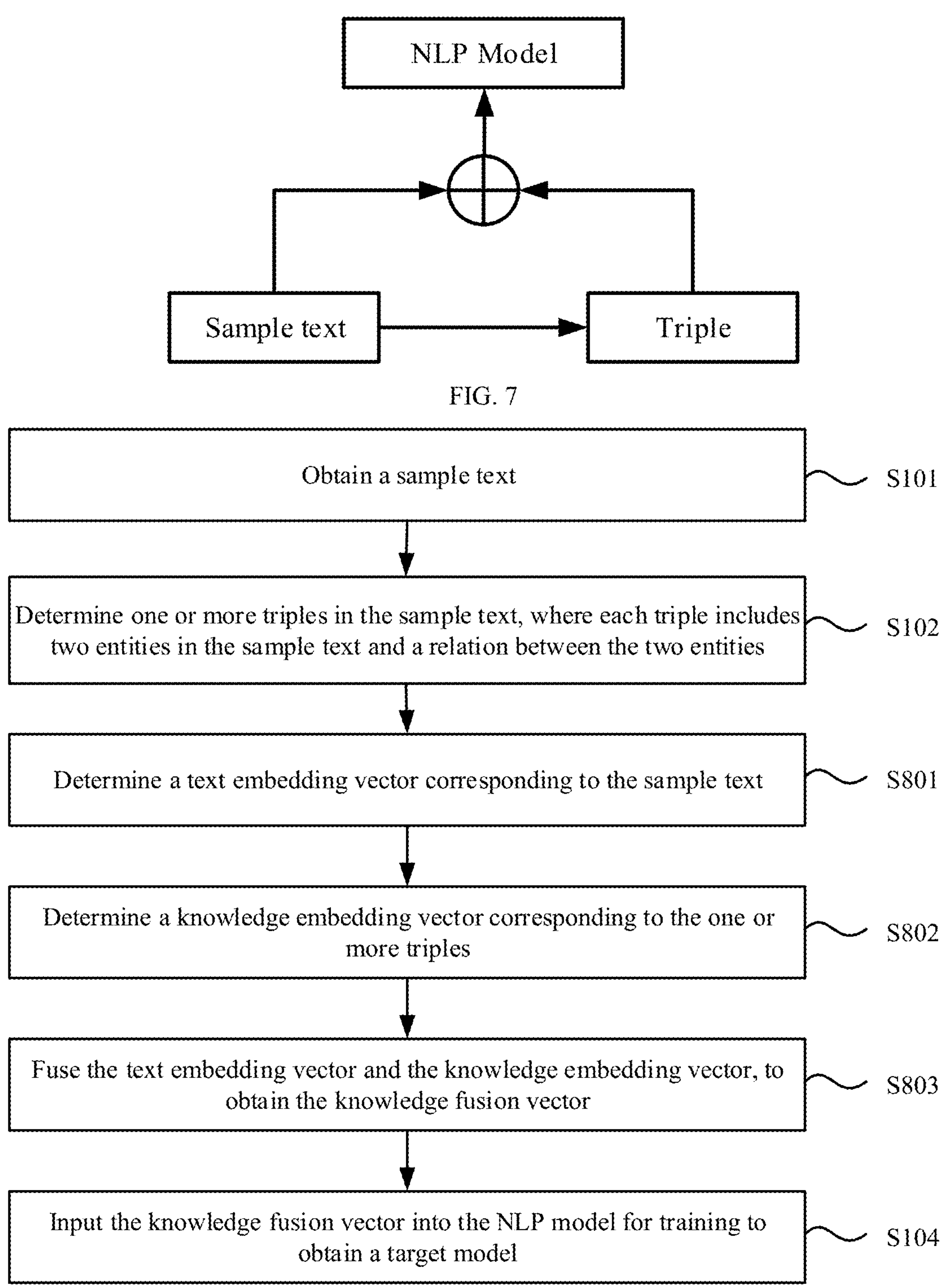
FIG. 7 is a schematic diagram of a relationship between a fusion process and an NLP model according to an embodiment of the present disclosure.
FIG. 8 is a flowchart of another method for training an NLP model according to an embodiment of the present disclosure.

FIG. 7 is a schematic diagram of a relationship between a fusion process and an NLP model according to an embodiment of the present disclosure.

As illustrated in FIG. 7, a triple in the sample text may be determined, the triple includes two entities in the sample text and the relation between the two entities, and then the triple may be inserted into the sample text to obtain a knowledge fusion vector, and lastly the knowledge fusion vector may be input as samples to the NLP model for training. Triples may be considered as key information in the sample text, so inserting the triples into the sample text for model training may enable the model to repeatedly learn the key information in the sample text, thereby better improving the training effect of the model.

In an embodiment, based on the embodiment of FIG. 7, when the first training task includes a masking task of masking sample text based on the triples, the inserted triples and the original sample text may be separately masked. This not only ensures the masking of the triples, but also can mask non-triple information in the sample text.

FIG. 8 is a flowchart of another method for training an NLP model according to an embodiment of the present disclosure. As illustrated in FIG. 8, fusing the sample text and the triple in the sample text to obtain the knowledge fusion vector includes: in step S801, determining a text embedding vector corresponding to the sample text; in step S802, determining knowledge embedding vector corresponding to the triple; in step S803, fusing the text embedding vector and the knowledge embedding vector, to obtain the knowledge fusion vector.

In an embodiment, on the one hand, the text embedding vector corresponding to the sample text may be determined, on the other hand, the knowledge embedding vector corresponding to the triple may be determined. For example, a preset algorithm (e.g., the graph embedding transformation algorithm (Translate)) may be used for training to obtain the knowledge embedding vector, and the preset algorithms include but are not limited to TranR, TransE, TransH, and TransD, etc.

In an embodiment, the method of performing word embedding processing on the sample text to obtain the corresponding text embedding vector includes at least one of one-hot encoding, word2vec, vocabulary transformation, and other methods.

In an embodiment, the method of performing word embedding processing on the sample text with the inserted triple may further include multiplying the trainable weight after one-hot encoding to obtain the word embedding vector, or after multiplying the trainable weight after one-hot encoding, performing word2vec to obtain word embedding vector. It is not limited here in the present disclosure.

In an embodiment, the triple includes at least one of the following: a head entity, a relation, and a tail entity.

Through the graph embedding transformation algorithm (Translate), the following may be obtained respectively: the embedding vector $h_e$ of the head entity h, the embedding vector $t_e$ of the tail entity t, and the embedding vector $r_e$ of the relation r.

In an embodiment, the specific steps for obtaining the knowledge embedding vector through the TransR algorithm are as follows: 1) projecting the entities h and t in the entity space into the relation r space through the projection matrix $M_r$, to obtain $h_e$ and $t_e$, where $h_e=hM_r$, $t_e=tM_r$; 2) performing training based on the loss function to enable an objective function to obtain the minimum value, where the objective function of the model training is $$f_r(h, t) = \|h_e + r_e - t_e\|_2^2,$$

so that the embedding vector $h_e$, $r_e$, and $t_e$ corresponding to h, r and t respectively may be obtained.

The target loss function may be, for example: $L=\Sigma_{(h,r,t)\in S}\Sigma_{(h',r',t')\in S'}\max(0,f_r(h,t)+\gamma-f_r(h',t'))$, where h' and t' represent the randomly replaced head entity and tail entity respectively, where the head entity or tail entity is randomly replaced based on the correct triple (h, r, t), the replaced triple is different from the original triple, and this part is the negative sample.

In an embodiment, determining the knowledge embedding vector corresponding to the triple includes: fusing the embedding vector of the head entity, the embedding vector of the relation, and the embedding vector of the tail entity to obtain the knowledge embedding vector: $e_k=\text{concat}(h_e+r_e+t_e)$; where, $e_k$ represents the knowledge embedding vector, $h_e$ represents the embedding vector of the head entity, $r_e$ represents the embedding vector of the relation, $t_e$ represents the embedding vector of the tail entity, and concat( ) represents the concatenation function.

In an embodiment, the text embedding vector may include the text embedding vector itself, and may further include at least one of the following: a sentence embedding vector, a position embedding vector corresponding to the tokens, and a task type embedding vector.

On the basis of fusing the text embedding vector itself and the knowledge embedding vector to obtain a knowledge fusion vector, other embedding vectors may also be further fused to obtain a knowledge fusion vector. Other embedding vectors may be determined according to the training task and are not limited to the above ones. For example, if a second pre-training task is needed, other embedding vectors may include a sentence embedding vector; for example, if a fourth pre-training task is needed, other embedding vectors may include task type embedding vector, and the fourth pre-training task may be used to classify training task types.

Regarding how to fuse the text embedding vector and the knowledge embedding vector, the following embodiments mainly illustrate two fusion methods, but in a specific application, the fusion method is not limited to the following two methods, and may be selected according to needs.

In an embodiment, the text embedding vector may include the text embedding vector itself, and may further include at least one of the following: a sentence embedding vector, a position embedding vector corresponding to the tokens, and a task type embedding vector.

Figure 9:
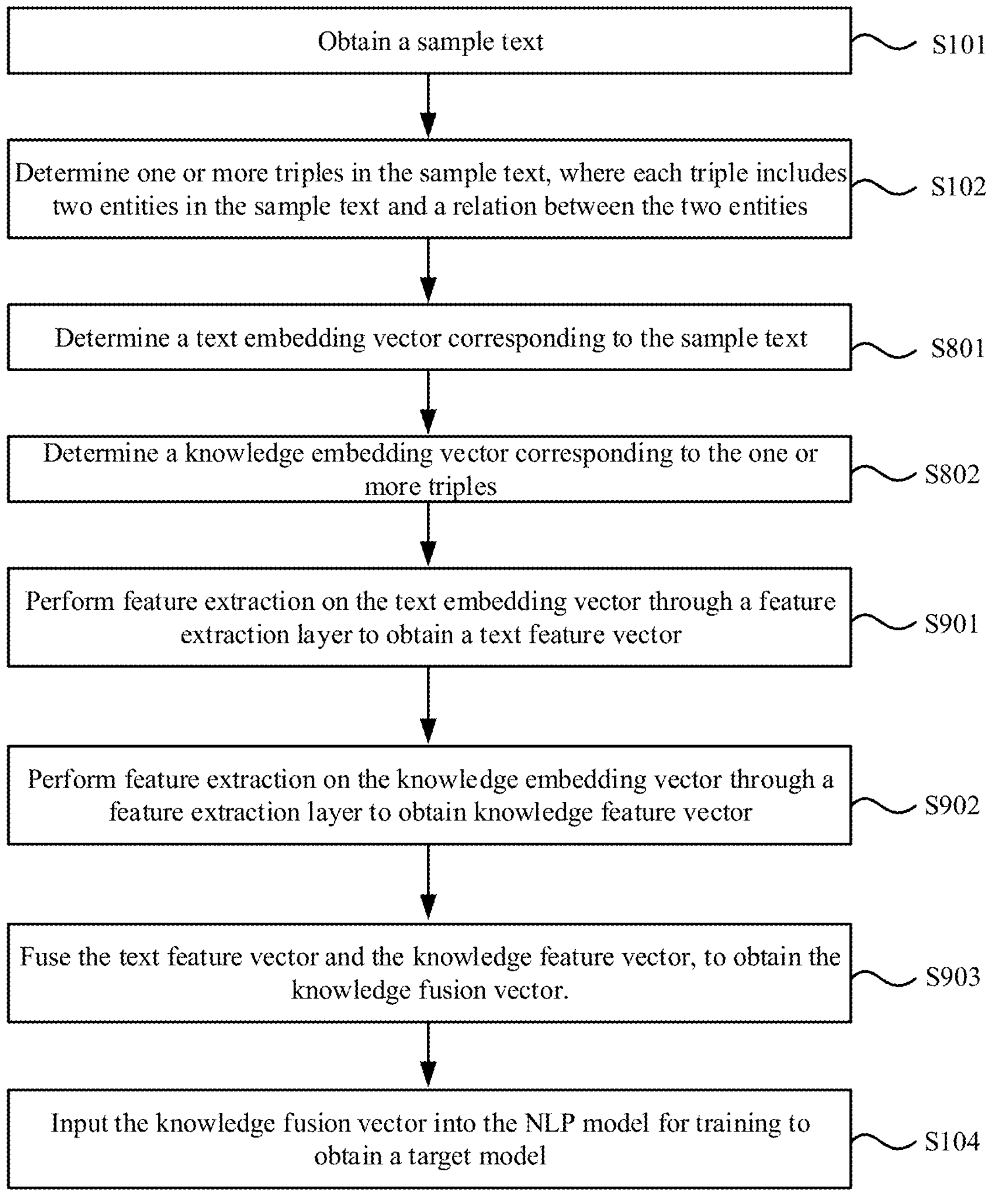
FIG. 9 is a flowchart of another method for training an NLP model according to an embodiment of the present disclosure.

FIG. 9 is a flowchart of another method for training an NLP model according to an embodiment of the present disclosure. As illustrated in FIG. 9, fusing the sample text and the triple in the sample text includes: in step S901, performing feature extraction on the text embedding vector through a feature extraction layer to obtain a text feature vector; in step S902, performing feature extraction on the knowledge embedding vector through a feature extraction layer to obtain a knowledge feature vector (the execution order of step S902 and step S901 is in no particular order, and may be set as needed, e.g., in parallel); in step S903, fusing the text feature vector and the knowledge feature vector, to obtain the knowledge fusion vector.

In an embodiment, through at least one feature extraction layer, feature extraction may be performed on the text embedding vector to obtain a text feature vector. For example, for the text embedding vector, feature extraction may be performed through a feature extraction layer A to obtain a text feature vector.

For a knowledge embedding vector, feature extraction may be performed through a feature extraction layer B to obtain a knowledge feature vector.

Lastly, fusing the text feature vector and the knowledge feature vector may be performed, to obtain the knowledge fusion vector.

In an embodiment, fusing the text feature vector and the knowledge feature vector includes fusing the text feature vector and the knowledge feature vector through a multilayer perceptron (MLP) layer.

In an embodiment, the knowledge embedding vector include at least one of the following: an embedding vector of an entity belonging to the triple; and an embedding vector of a relation belonging to the triple.

That is, for the knowledge embedding vector, through the feature extraction layer B, feature extraction may be performed only on the embedding vector of the entities in the triple to obtain the knowledge feature vector, or only on the embedding vector of the relation in the triple to obtain the knowledge feature vector, or on the embedding vectors of the entities and the relation in the triple together to obtain the knowledge feature vector. It may be understood that there may be one or more feature extraction layers A and one or more feature extraction layers B.

Figures 10, 11:
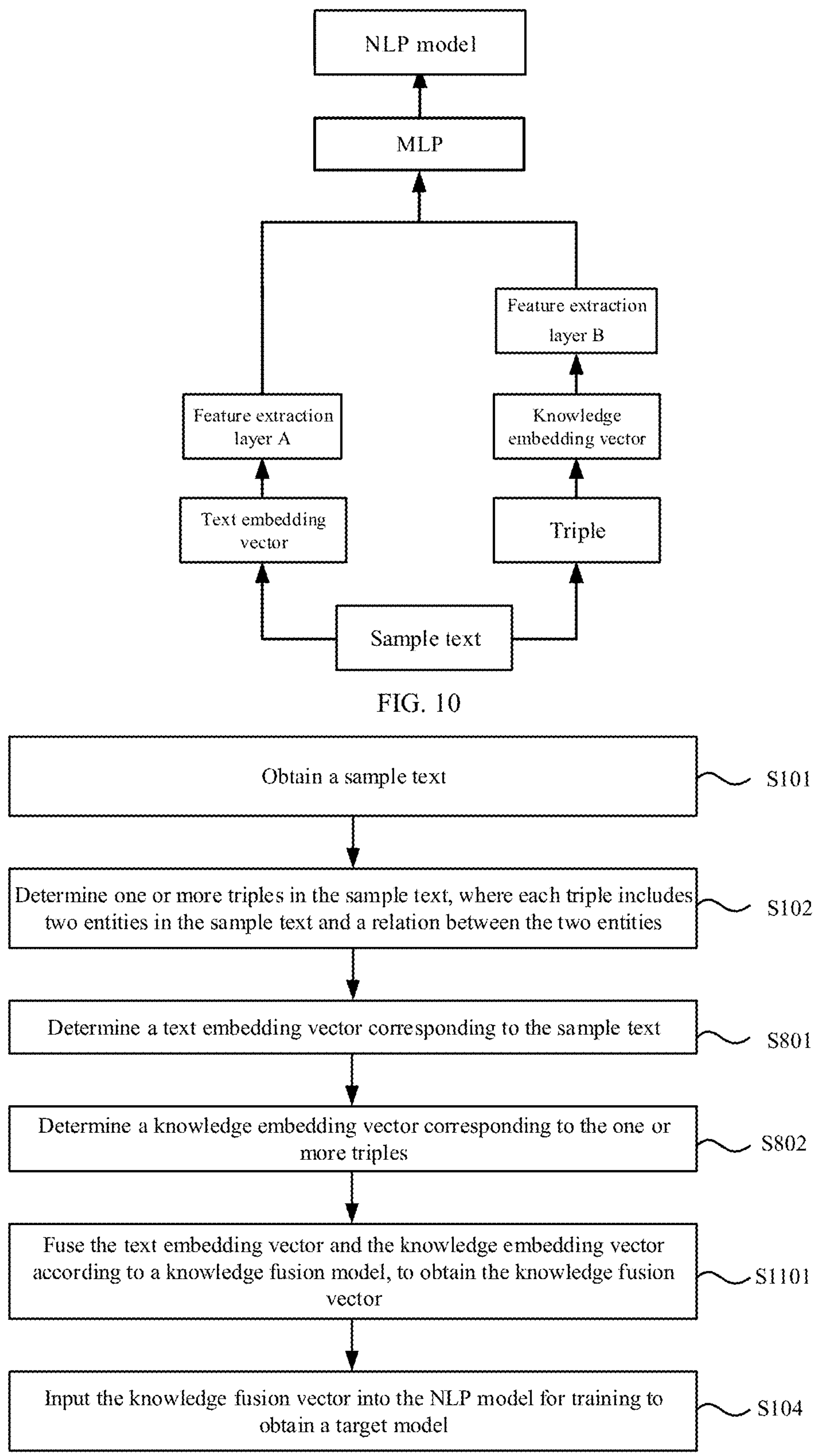
FIG. 10 is a schematic diagram of another relationship between a fusion process and an NLP model according to an embodiment of the present disclosure.
FIG. 11 is a flowchart of another method for training an NLP model according to an embodiment of the present disclosure.

FIG. 10 is a schematic diagram of another relationship between a fusion process and an NLP model according to an embodiment of the present disclosure.

As illustrated in FIG. 10, on the one hand, the text embedding vectors corresponding to the sample text may be determined; on the other hand, the triples may be determined in the sample text, and then for the triples, the knowledge embedding vectors corresponding to the triples in the knowledge graph may be determined.

Next, on the one hand, the text embedding vector may be input into the feature extraction layer A to obtain the extraction result as the text feature vector; on the other hand, the knowledge embedding vector may be input into the feature extraction layer B to obtain the knowledge feature vector.

Lastly, through the MLP layer, the text feature vector and the knowledge feature vector may be fused to obtain the knowledge fusion vector, and the knowledge fusion vector may be input into the NLP model as a sample for training.

It may be understood that the selection of feature extraction layers A and B relate to the NLP model, i.e., the feature extraction layer in the fusion process is the same as the feature extraction layer in the NLP model, thus ensuring that the NLP model directly calculates the knowledge fusion vector.

FIG. 11 is a flowchart of another method for training an NLP model according to an embodiment of the present disclosure. As illustrated in FIG. 11, fusing the sample text and the triple in the sample text includes: in step S1101, fusing the text embedding vector and the knowledge embedding vector according to a knowledge fusion model, and the knowledge fusion model includes:

$$f_i = \sigma\left(W_t^i e_t^i + W_e^i e_k^i + b_i\right);$$

where, $f_j$ represents the knowledge fusion vector, $e_t$ represents the text embedding vector, $e_k$ represents the knowledge embedding vector, $W_t$ represents the weight of the text embedding vector, $W_e$ represents the weight of the knowledge embedding vector, b represents the bias, i represents the i-th token in the corresponding sample text.

In embodiments of the present disclosure, $W_t$ and $W_e$ are the weight of the text embedding vector and the weight of the knowledge embedding vector respectively, which may be used as parameters for training. By setting $W_t$ and $W_e$, the effect of a filter may be achieved, which reduces the impact of interference or an irrelevant token and knowledge on the fusion result.

In an embodiment, the fusion of the text embedding vector and the knowledge embedding vector may be performed through an activation function σ, during the fusion process.

Figures 12A, 12B:
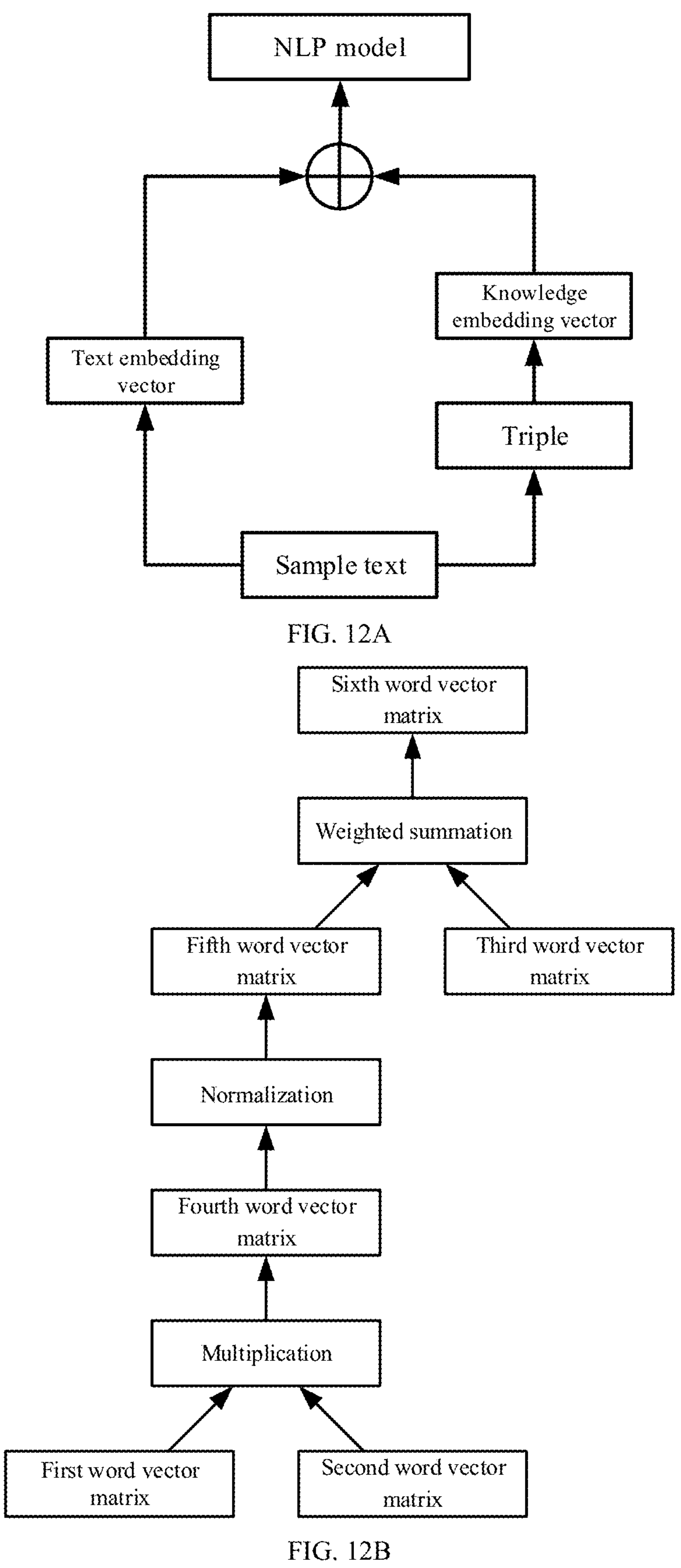
FIG. 12A is a schematic diagram of another relationship between a fusion process and an NLP model according to an embodiment of the present disclosure.
FIG. 12B is a schematic diagram of a computing process of feature extraction according to an embodiment of the present disclosure.

FIG. 12A is a schematic diagram of another relationship between a fusion process and an NLP model according to an embodiment of the present disclosure.

As illustrated in FIG. 12A, a triple in the sample text may be determined, where the triple includes two entities in the sample text and the relation between the two entities, then, the knowledge embedding vector corresponding to the triple may be determined, and then the knowledge embedding vector and the text embedding vector are fused to obtain the knowledge fusion vector, and lastly the knowledge fusion vector may be input into the NLP model as a sample.

As illustrated in FIG. 12A, on the one hand, the text embedding vector corresponding to the sample text may be determined; on the other hand, the triple may be determined in the sample text, and then for the triple, the knowledge embedding vector corresponding to the triple in the knowledge graph may be determined.

Next, according to the knowledge fusion model $$f_i = \sigma\left(W_t^i e_t^i + W_e^i e_k^i + b_i\right),$$

the text embedding vector $e_t$ and the knowledge embedding vector $e^k$ may be fused, to obtain the knowledge fusion vector $f_i$, lastly, the knowledge fusion vector is input into the NLP model as a sample for training.

FIG. 12B is a schematic diagram of a computing process of feature extraction according to an embodiment of the present disclosure.

The NLP model includes at least one feature extraction layer, and the feature extraction layer is configured to: perform a linear transformation on the knowledge fusion vector, to obtain at least two knowledge fusion matrices including a first knowledge fusion matrix and a second knowledge fusion matrix; determine an association matrix according to the first knowledge fusion matrix, where the association matrix represents association relation between at least one entity in the sample text and tokens in the sample text; and determine a weight matrix according to the second knowledge fusion matrix and the association matrix, where the weight matrix represents weight between the at least one entity in the sample text and the sample text.

Further, a third knowledge fusion matrix may be obtained by performing a linear transformation on the knowledge fusion vector, and an association matrix is determined according to the first fusion matrix and the third fusion matrix.

As illustrated in FIG. 12B, from the perspective of the computing process, the function of the feature extraction layer may be described as: multiplying the knowledge embedding vector by a training matrix to obtain the first word vector matrix, the second word vector matrix, and the third word vector matrix; multiplying the first word vector matrix and the second word vector matrix (transposing) to obtain the fourth word vector matrix; performing normalization on the fourth word vector matrix to obtain the fifth word vector matrix; and based on the fifth word vector, performing a weighted summation of the third word vector matrix to obtain the sixth word vector matrix.

In an embodiment, before the normalization is performed on the fourth word vector matrix, a scale transformation may further be performed, e.g., the fourth word vector matrix is divided by $\sqrt{d_k}$, where $d_k$ represents the word embedding vector dimensionality.

It may be understood that, based on the embodiment of FIG. 12B, the first word vector matrix is the first knowledge fusion matrix, the third word vector matrix is the second knowledge fusion matrix, the fourth word vector matrix or the fifth word vector matrix is the association matrix, and the sixth word vector matrix is the weight matrix. The second word vector matrix is the third knowledge fusion matrix. Based on the fifth word vector performing a weighted summation of the third word vector matrix is multiplying the fifth word vector matrix and the third word vector matrix. The training matrix is a matrix whose parameters are continuously adjusted during the training process, and the knowledge embedding vector is multiplied by a training matrix with varying parameters obtained through training, so that the first word vector matrix, the second word vector matrix, and the third word vector matrix are obtained. These three word vector matrices all include at least text information and triple information (entities) in the knowledge embedding vector, so they may all be called knowledge fusion matrices. In order to obtain an association matrix representing the association relation between at least one entity in the sample text and tokens in the sample text, the computation may be performed by the inner product of two fusion matrices (i.e., the transpose multiplication of the first word vector matrix and the second word vector matrix), covariance, Euclidean distance, etc., which are not limited here. By multiplying the obtained association relationship by its own fusion matrix (i.e., weighted summation is performed on the third word vector matrix based on the fifth word vector matrix), the weight of each token (including the entity) relative to the entire sample text, i.e., the weight matrix, may be obtained. Matrix multiplication may also be multiplication by the transpose of the matrix and may be adjusted according to the actual situation, which is not limited here.

In an embodiment, the feature extraction layer may have a plurality of parallel computations, and then concatenate (concat) the results and input them as a whole into the next layer model, so that they may be mapped to different subspaces for computations, which improves the accuracy of the model.

In an embodiment, the feature extraction layer includes but is not limited to an attention layer, a self-attention layer, a multi-head self-attention layer, etc. In the case where the feature extraction layer includes a self-attention layer, the NLP model may be a Transformer model, Transformer XL model, Bert model, GPT model, etc., which is not limited in the present disclosure.

In an embodiment, the dimensionality of the NLP model is variable, and the dimensionality refers to the dimensionality of the knowledge fusion vector that is input into a model.

In an embodiment, the dimensionality of the NLP model is variable, including that the dimensionality of the NLP model may be adjusted according to preset conditions, such as user settings, hardware resources, etc. In another embodiment, the dimensionality of the NLP model is variable, including that the NLP model includes at least two feature extraction layers, for example, at least the first feature extraction layer and the second feature extraction layer, which have different dimensionalities. It may be understood that, the first feature extraction layer and the second feature extraction layer have different dimensionalities, that is, the association matrixs of the first feature extraction layer and the second feature extraction layer and/or the weight matrixs of the first feature extraction layer and the second feature extraction layer have different dimensionalities.

In an embodiment, the at least one feature extraction layer at least includes a first feature extraction layer and a second feature extraction layer, and the dimensionality of the association matrix in the second feature extraction layer is variable relative to a dimensionality of the weight matrix in the first feature extraction layer.

In an embodiment, the dimensionality of the second feature extraction layer is less than the dimensionality of the first feature extraction layer. During the deep learning process of a plurality of feature extraction layers of the NLP model, gradually reducing the dimensionality of the feature extraction layers helps reduce the quantity of parameters, which improves computing efficiency and enhances real-time capabilities. The quantity of times the dimensionality is reduced may be 1, or may be 2 to 3 times, which is not limited in the present disclosure.

In an embodiment, the dimensionality of the association matrix in the second feature extraction layer is less than the dimensionality of the weight matrix in the first feature extraction layer.

In an embodiment, the at least one feature extraction layer further includes at least one third feature extraction layer, the third feature extraction layer includes a masking matrix, the masking matrix is used to partially mask the association matrix.

For example, the first feature extraction layer may exist in the form of a TransformerXL model, the second feature extraction layer may exist in the form of a Transformer model or Bidirectional Encoder Representation from Transformers (BERT) model, and the third feature extraction layer may exist in the form of a Transformer model or Generative Pre-Training (GPT) model.

For example, when the first feature extraction layer and the second feature extraction layer are both multi-head self-attention layers, the third feature extraction layer may be a masked multi-head self-attention layer. The following embodiments are mainly exemplified in this case.

In an embodiment, the second feature extraction layer is arranged after the first feature extraction layer.

In an embodiment, the dimensionality of the third feature extraction layer may be less than the dimensionality of the first feature extraction layer and equal to the dimensionality of the second feature extraction layer.

In an embodiment, the third feature extraction layer is arranged after the first feature extraction layer.

Figure 13:
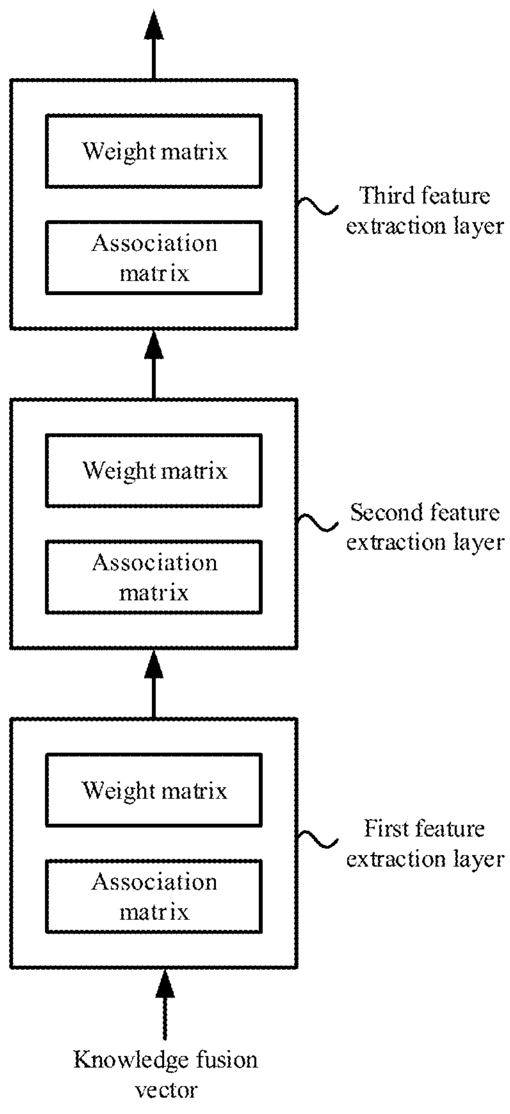
FIG. 13 is a schematic diagram of a relationship between feature extraction layers according to an embodiment of the present disclosure.
Figure 14:
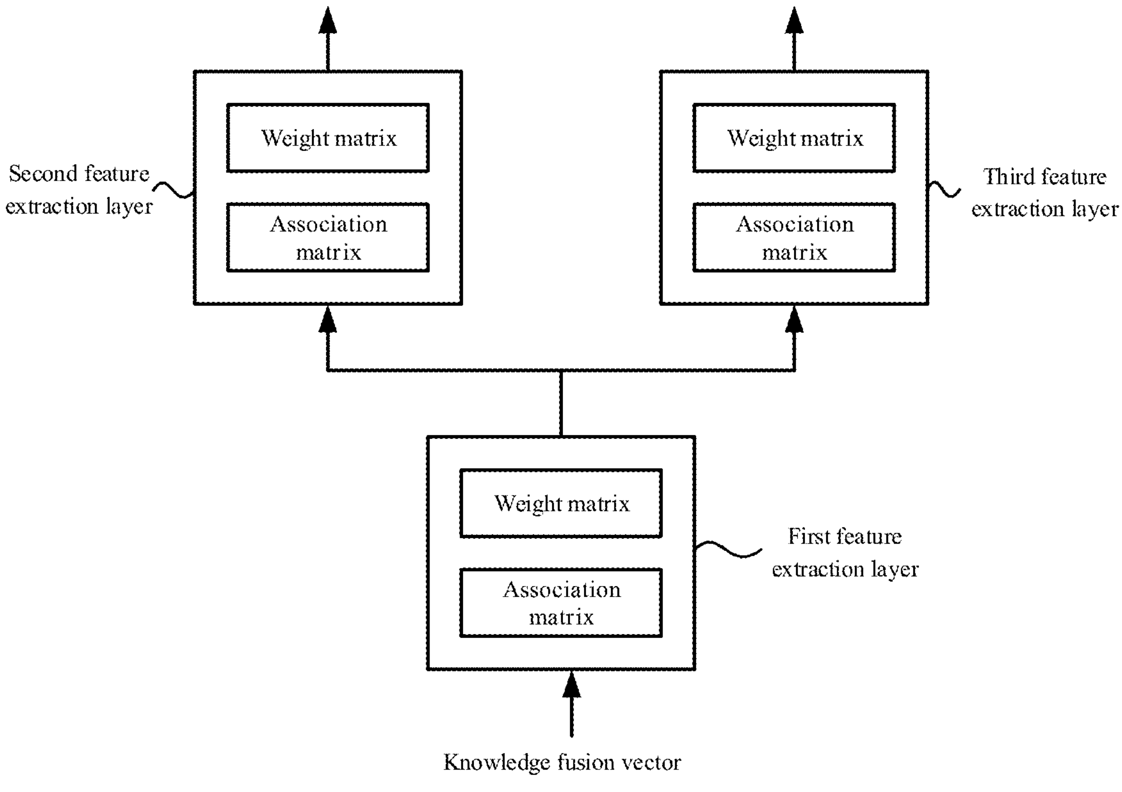
FIG. 14 is a schematic diagram of another relationship between feature extraction layers according to an embodiment of the present disclosure.

FIG. 13 is a schematic diagram of a relationship between feature extraction layers according to an embodiment of the present disclosure. FIG. 14 is a schematic diagram of another relationship between feature extraction layers according to an embodiment of the present disclosure.

In an embodiment, as illustrated in FIG. 13, the third feature extraction layer is arranged after the first feature extraction layer, which may be that the third feature extraction layer is arranged after the first feature extraction layer and after the second feature extraction layer.

It should be noted that in all embodiments of the present disclosure, one layer is arranged after another layer means that the output of the previous layer is used as the input of the subsequent layer, or one layer is arranged before another layer means that the input of the subsequent layer includes the output of the previous layer. The output of the previous layer may be directly used as the input of the subsequent layer, or after other computations and then be used as the input of the subsequent layer.

In an embodiment, when the training task is a generation task, the second feature extraction layer is frozen, and when the training task is a semantic understanding task, the third feature extraction layer is frozen.

In an embodiment, as illustrated in FIG. 14, the third feature extraction layer is arranged after the first feature extraction layer, which may be on the basis that the second feature extraction layer is arranged after the first feature extraction layer, the third feature extraction layer is parallel to the second feature extraction layer and arranged after the first extraction layer.

The output of the target model may include the output passing through all feature extraction layers, or may be the output passing through some feature extraction layers, e.g., the output passing through only at least one first feature extraction layer, the output passing through at least one first feature extraction layer and at least one second feature extraction layer, or the output of at least one first feature extraction layer and at least one third feature extraction layer. It may be understood that for the output passing through at least one first feature extraction layer and at least one second feature extraction layer, the third feature extraction layer is frozen and does not participate in the training process, and for the output passing through at least one first feature extraction layer and at least one third feature extraction layer, the second feature extraction layer is frozen and does not participate in the training process.

In an embodiment, when the training task is a generation task, the second feature extraction layer is frozen, and when the training task is a semantic understanding task, the third feature extraction layer is frozen. The training tasks may include the above pre-training tasks (in addition to the above three pre-training tasks, the pre-training tasks may further include a generation task), and may further include a subsequent fine-tuning task. For example, the above first pre-training task, second pre-training task and third pre-training task may be regarded as semantic understanding tasks, therefore, a fifth pre-training task may further be constructed, which may be used for a prediction task to generate the content to be input according to the input text, and the fifth pre-training task is regarded as a generation task.

A masking matrix may be set in the third feature extraction layer and configured to implement the prediction task. In this case, the second feature extraction layer may be used for semantic understanding, and the third feature extraction layer may be configured to predict the following content, for example, predict the text to be input according to the input text and generate the text to be input.

Therefore, when the training task is a generation task, it may be implemented based on the third feature extraction layer, so the second feature extraction layer may be frozen, and when the training task is a semantic understanding task, it may be implemented based on the second feature extraction layer, so the third feature extraction layer may be frozen.

Accordingly, it is beneficial to simplify the training process.

In an embodiment, a first dimensionality transformation layer is further included between the first feature extraction layer and the second feature extraction layer, and is configured to perform a dimensionality variation on the weight matrix obtained by the first feature extraction layer, to obtain an output matrix after the dimensionality variation as an input of the second feature extraction layer, so that the dimensionality variation between the feature extraction layers is implemented.

Since the first feature extraction layer and the second feature extraction layer may have different dimensionalities, for example, the dimensionality of the first feature extraction layer is greater than the dimensionality of the second feature extraction layer, for example, the dimensionality of the first feature extraction layer is 4096, and the dimensionality of the second feature extraction layer is 768.

In order to input the output of the first feature extraction layer into the second feature extraction layer, first it is necessary to convert the dimensionality of the output of the first feature extraction layer into the dimensionality of the second feature extraction layer. Therefore, a first dimensionality transformation layer may be set between the first feature extraction layer and the second feature extraction layer, so that the dimensionality variation is performed on the weight matrix obtained by the first feature extraction layer, and an output matrix after dimensionality reduction is obtained as the input of the second feature extraction layer.

For example, when the dimensionality of the first feature extraction layer is 4096 and the dimensionality of the second feature extraction layer is 768, the dimensionality transformation may specifically be dimensionality reduction.

In an embodiment, the first dimensionality transformation layer may be composed of at least one dimensionality transformation unit, and the dimensionality transformation unit includes a liner layer.

For example, for a dimensionality transformation unit, the output of the first feature extraction layer includes an output embedding vector, and the output embedding vector is input into the liner layer. The liner layer performs dimensionality reduction processing on the output of the first feature extraction layer, which may adjust the dimensionality of the output of the first feature extraction layer. Further the output of the first feature extraction layer after the dimensionality reduction is then input into the next feature extraction layer, e.g., the second feature extraction layer and/or the third feature extraction layer.

In an embodiment, after processing by liner layers in a plurality of dimensionality transformation units, the output of the first feature extraction layer may be gradually reduced to the same dimensionality as the second feature extraction layer.

Figure 15:
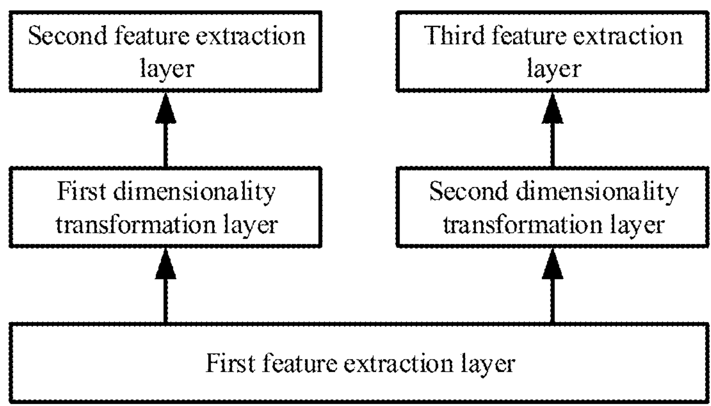
FIG. 15 is a schematic diagram of a dimensionality transformation according to an embodiment of the present disclosure.

FIG. 15 is a schematic diagram of a dimensionality transformation according to an embodiment of the present disclosure.

In an embodiment, as illustrated in FIG. 15, a second dimensionality transformation layer is further included between the first feature extraction layer and the third feature extraction layer and is configured to perform the dimensionality variation on the weight matrix obtained by the first feature extraction layer, to obtain the output matrix after the dimensionality reduction as the input of the third feature extraction layer. It should be noted that the first dimensionality transformation layer and the second dimensionality transformation layer may be different dimensionality transformation layers as illustrated in FIG. 15, or may be set as the same dimensionality transformation layer as needed.

In an embodiment, the dimensionality of the third feature extraction layer may be the same as the dimensionality of the second feature extraction layer, e.g., also be 768. In order to input the output of the first feature extraction layer into the third feature extraction layer, first, it is necessary to transform the dimensionality of the output of the first feature extraction layer into the dimensionality of the third feature extraction layer. Therefore, a second dimensionality transformation layer may be set between the first feature extraction layer and the third feature extraction layers, so that the dimensionality variation is performed on the weight matrix obtained by the first feature extraction layer, and the output matrix after the dimensionality reduction is obtained as the input of the third feature extraction layer.

The principle of the second dimensionality transformation layer is similar to the principle of the first dimensionality transformation layer, which will not be described again here.

Figure 16:
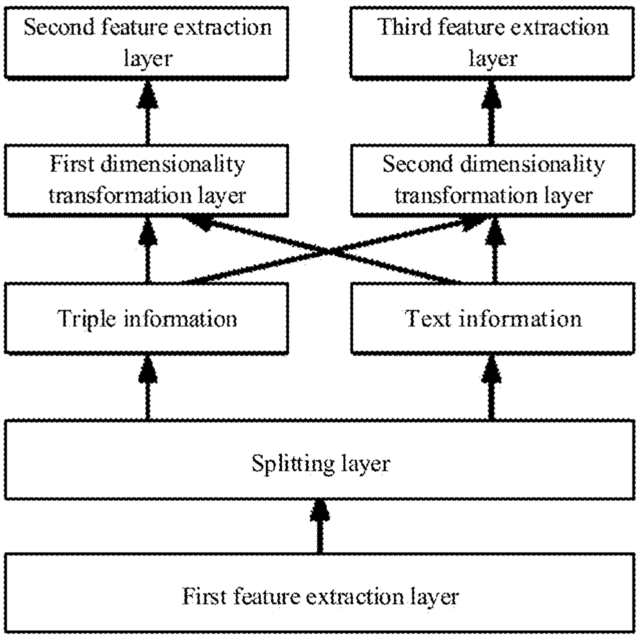
FIG. 16 is a schematic diagram of another dimensionality transformation according to an embodiment of the present disclosure.

FIG. 16 is a schematic diagram of another dimensionality transformation according to an embodiment of the present disclosure.

In an embodiment, as illustrated in FIG. 16, before the second feature extraction layer and the third feature extraction layer, a splitting layer is further included, which is configured to split an output of the first feature extraction layer into triple information and text information; where the first dimensionality transformation layer is configured to perform a dimensionality variation on the weight matrix obtained by the first feature extraction layer to obtain the output matrix after the dimensionality reduction as the input of the second feature extraction layer, or is configured to perform the dimensionality variation on the triple information to obtain a matrix after dimensionality reduction as the input of the second feature extraction layer; a second dimensionality transformation layer is further included between the first feature extraction layer and the third feature extraction layer and is configured to perform the dimensionality variation on the weight matrix obtained by the first feature extraction layer to obtain an output matrix after the dimensionality variation as an input of the third feature extraction layer, or is configured to perform a dimensionality variation on the text information to obtain a matrix after dimensionality reduction as an input of the third feature extraction layer.

In an embodiment, since the input of the first feature extraction layer includes a knowledge fusion vector, and the knowledge fusion vector is obtained by fusing the text embedding vector corresponding to the sample text and the knowledge embedding vector corresponding to the triple, the output of the first feature extraction layer also contains triple information associated with the knowledge embedding vector and text information associated with the text embedding vector.

In addition, based on the above embodiments, it may be seen that the second feature extraction layer is mainly used for the semantic understanding task, and the third feature extraction layer is mainly used for the generation task. Since the semantic understanding task mainly focuses on the tokens and the relations between the tokens in the text, it may be expressed relatively accurately through the triple information, while the generation task mainly focuses on the tokens themselves in the text and pays less attention to the relationship between tokens, so it may be expressed relatively accurately through text information.

Thus, for the second feature extraction layer, only the triple information may be used as input, so in the first dimensionality transformation layer, the dimensionality transformation may be performed only on the triple information, and then the transformed triple information is input into the second feature extraction layer; for the third feature extraction only the text information may be used as input, so in the second dimensionality transformation layer, the dimensionality transformation may be performed only on the text information, and then the dimensionally transformed text information is input into the third feature extraction layer. By setting a splitting layer, the redundant data may be reduced, which further improves computing efficiency.

In an embodiment, after inserting the triple in the sample text into the sample text to obtain the knowledge fusion vector, the position of the triple corresponding to the inserted text may be marked, and after passing through the first feature extraction layer, the output vector matrix is obtained. According to the marked position for the triple, the splitting layer may split the matrix information corresponding to the triple information (such as triple) and the text information in the output vector matrix, so that the triple information matrix and the sample text information matrix are generated.

Of course, the dimensionality transformation may also be performed on the text information and the triple information together in the first dimensionality transformation layer and then the transformed information is input into the second dimensionality transformation layer, or the dimensionality transformation may also be performed on the text information and the triple information together in the second dimensionality transformation layer and then the transformed information is input into the third dimensionality transformation layer.

In an embodiment, in the case that the NLP model includes a first feature extraction layer, a second feature extraction layer and a third feature extraction layer, the NLP model may further include a residual network, a feed forward neural network layer, etc.

Figure 17A:
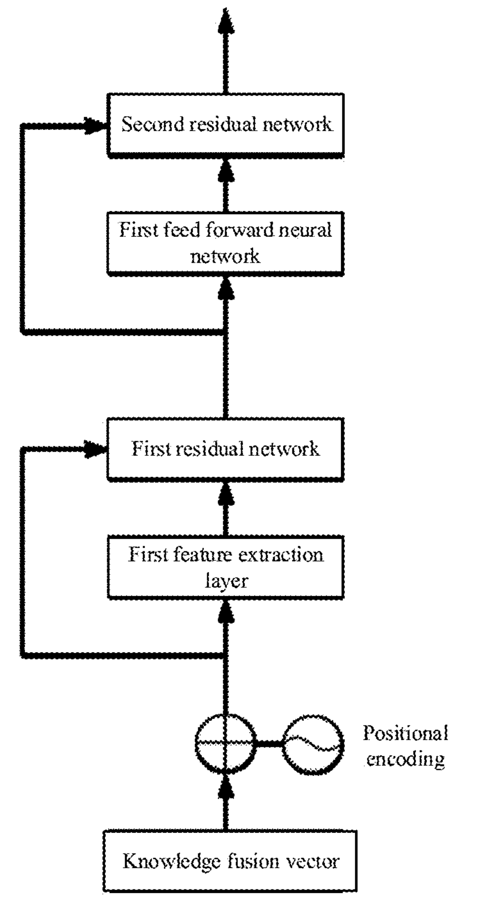
FIG. 17A is a partial structure diagram of an NLP model according to an embodiment of the present disclosure.

FIG. 17A is a partial structure diagram of an NLP model according to an embodiment of the present disclosure.

In an embodiment, as illustrated in FIG. 17A, the NLP model includes the first feature extraction layer and the first residual network (the specific computation process includes an Add&Norm layer), where the input of the first feature extraction layer includes the knowledge fusion vector, the input of the first residual network includes the knowledge fusion vector and the output of the feature extraction layer. The NLP model further includes a first feed forward neural network layer and a second residual network, where the input of the first feed forward neural network layer includes the output of the first module, and the input of the second residual network includes the output of the first feed forward neural network layer and the output of the first module.

In an embodiment, a positional encoding of the tokens in the sample text may also be determined, and then the positional encoding features and the knowledge fusion vector are superimposed and then input into the first feature extraction layer.

In another embodiment, the knowledge fusion vector input into the first feature extraction layer may not include a positional encoding, but a sequence encoding matrix is set in the first feature extraction layer to supplement the position information. The sequence encoding matrix is composed of an upper triangular matrix and a lower triangular matrix, the upper triangular matrix is different from the lower triangular matrix, and any element value of the sequence encoding matrix is not 0. In an embodiment, each element of the upper triangular matrix of the sequence encoding matrix has the same value, and each element of lower triangular matrix of the sequence encoding matrix has the same value. Further, each element value of the upper triangular matrix may be 1 or −1, and each element value of the lower triangular matrix may be −1 or 1. The sequence encoding matrix may be arranged between the association matrix and the weight matrix (which may function as positional encoding), for example, the association matrix is multiplied by the sequence encoding matrix to obtain the position information. Through the upper triangular and lower triangular matrices, the sequence encoding matrix may enable the model to learn the relative position information of the sample text, and enable the model to learn the sequential relation information between at least one entity and the sample text, which improves the effect of model training.

Figure 17B:
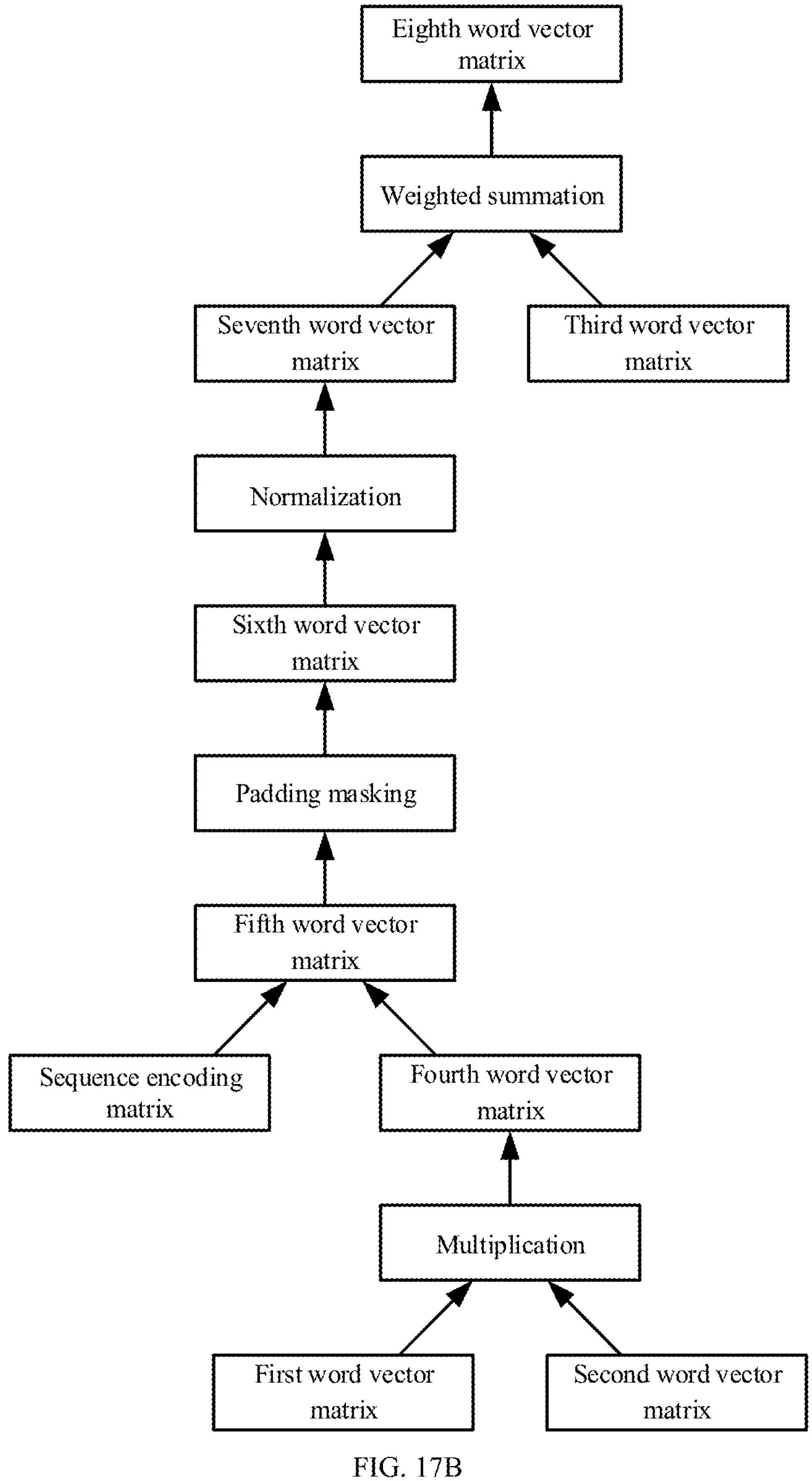
FIG. 17B is a schematic diagram of a computing process of a first feature extraction layer according to an embodiment of the present disclosure.

FIG. 17B is a schematic diagram of a computing process of a first feature extraction layer according to an embodiment of the present disclosure.

As illustrated in FIG. 17B, from the perspective of the computing process, the function of the first feature extraction layer may be described as multiplying the knowledge embedding vector by a training matrix to obtain the first word vector matrix, the second word vector matrix, and the third word vector matrix; multiplying the first word vector matrix and the second word vector matrix to obtain the fourth word vector matrix; encoding the fourth word vector matrix through a sequence encoding matrix to obtain the fifth word vector matrix; masking (padding masking) the fifth word vector matrix to obtain the sixth word vector matrix; performing the normalization on the sixth word vector matrix to obtain the seventh word vector matrix; and based on the seventh word vector performing a weighted summation of the third word vector matrix to obtain the eighth word vector matrix.

In an embodiment, after receiving the knowledge fusion vector, the first feature extraction layer may repeat the functions of the first feature extraction layer, the first residual network, the first feed forward network, and the second residual network several times, and then outputting the result.

Figure 18:
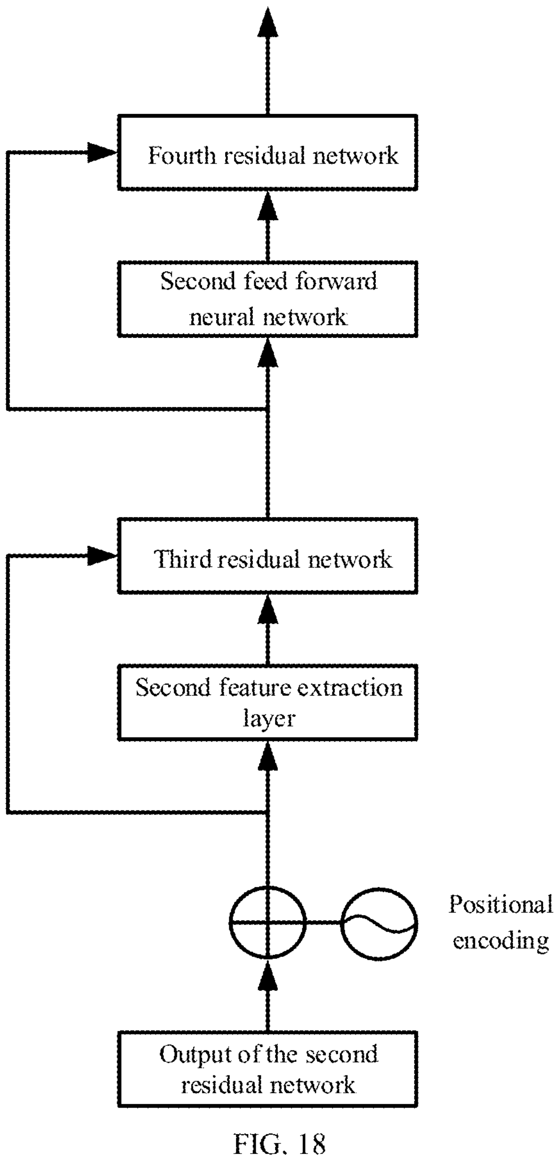
FIG. 18 is another partial structure diagram of an NLP model according to an embodiment of the present disclosure.
Figure 19:
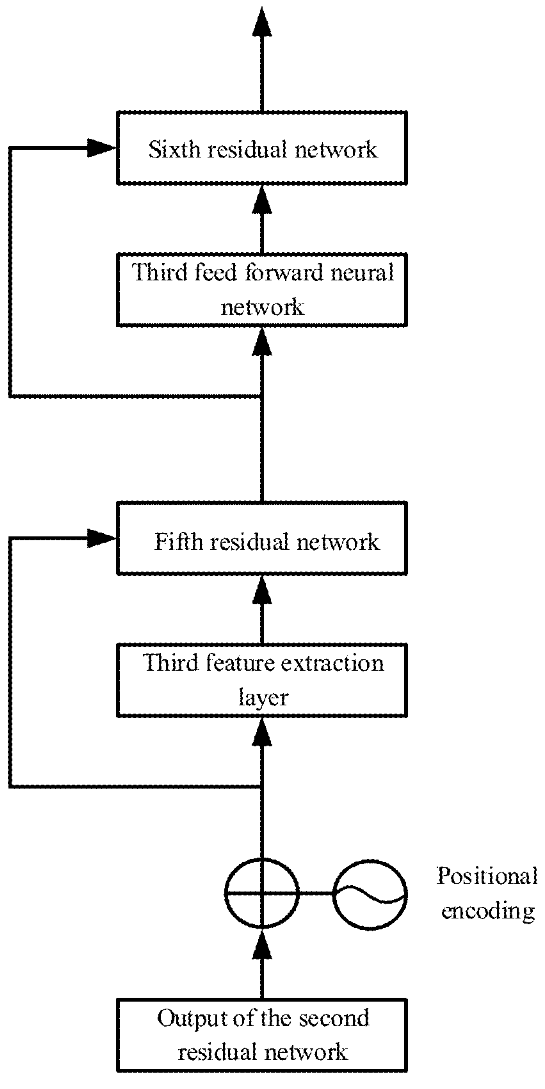
FIG. 19 is another partial structure diagram of an NLP model according to an embodiment of the present disclosure.

FIG. 18 is another partial structure diagram of an NLP model according to an embodiment of the present disclosure. FIG. 19 is another partial structure diagram of an NLP model according to an embodiment of the present disclosure.

In an embodiment, as illustrated in FIG. 18, the NLP model further includes the second feature extraction layer and a third residual network, where the input of the second feature extraction layer includes the output of the second residual network, and the input of the third residual network includes the output of the second residual network and the output of the third feature extraction layer; and the NLP model further includes the second feed forward neural network layer and the fourth residual network, where the input of the second feed forward neural network layer includes the output of the third residual network, and the input of the fourth residual network includes the output of the second feed forward neural network layer and the output of the third residual network.

In an embodiment, a positional encoding of the tokens in the sample text may further be determined, and then the positional encoding features and the output of the first feature extraction layer are superimposed to obtain the superimposed embedding vector, which is then input into the first submodel.

In an embodiment, after receiving the knowledge fusion vector, the first feature extraction layer may repeat the functions of the second feature extraction layer, the third residual network, the second feed forward neural network layer, and the fourth residual network several times, and then outputting the result.

In an embodiment, as illustrated in FIG. 19, the NLP model further includes the third feature extraction layer and a fifth residual network, where the input of the third feature extraction layer includes the output of the second residual network, and the input of the fifth residual network includes the output of the second residual network and the output of the third feature extraction layer; and the NLP model further includes the third feed forward neural network layer and the sixth residual network, where the input of the third feed forward neural network layer includes the output of the fifth residual network, and the input of the sixth residual network includes the output of the third feed forward neural network layer and the output of the fifth residual network.

In an embodiment, a positional encoding of the tokens in the sample text may further be determined, and then the positional encoding features and the output of the first feature extraction layer are superimposed to obtain the superimposed embedding vector, which is then input into the second submodel.

In an embodiment, after receiving the knowledge fusion vector, the second submodel may repeat the functions of the third feature extraction layer, the fifth residual network, the third feed forward neural network layer, and the sixth residual network several times, and then outputting the result.

In an embodiment, when the training task is a generation task, the second feature extraction layer is frozen, and when the training task is a semantic understanding task, the third feature extraction layer is frozen, which may specifically refer to: when the training task is a generation task the first submodel is frozen, and when the training task is a semantic understanding task, the second submodel is frozen.

The method for training a natural language processing model provided by embodiments of the present disclosure involves processing of natural language text, and may be specifically applied to data processing methods such as data training, machine learning, and deep learning, etc. Symbolic and formalized intelligent information modeling, extraction, preprocessing, training, etc. are performed on the training data (sample text and an initial knowledge fusion vector in the present disclosure) to obtain a trained target processing model at the end, and the text processing method provided by the embodiments of the present disclosure may use the above trained target processing model to input the input data (e.g., the text to be processed in the present disclosure) into the trained target processing model, so as to obtain the output data (e.g., the processing result corresponding to the target task in the present disclosure).

It should be noted that the method for training a natural language processing model and the text processing method provided by the embodiments of the present disclosure are inventions based on the same concept, and may also be understood as two parts of a system, or two stages of an overall process, e.g., model training stage and model application stage.

According to the embodiments of the present disclosure, a text processing method is further provided, including obtaining a target text, determining a triple in the target text, where the triple includes two entities in the target text and a relation between the two entities; processing the target text based on the triple to obtain a knowledge fusion vector, and inputting the knowledge fusion vector into a target model to obtain a processing result of the target text; where the target model includes at least one feature extraction layer, and the feature extraction layer is configured to perform a linear transformation on the knowledge fusion vector, to obtain at least two knowledge fusion matrices including a first knowledge fusion matrix and a second knowledge fusion matrix, determine an association matrix according to the first knowledge fusion matrix, where the association matrix represents association relation between at least one entity in the target text and tokens in the target text; and determine a weight matrix according to the second knowledge fusion matrix and the association matrix, where the weight matrix represents weight between the at least one entity and the target text.

The processing results include at least one of the following information: translation information of the text data, reply information of the text data, and classification information of the text data or association relation between the text data and other reference text data.

In an embodiment, the at least one feature extraction layer at least includes a first feature extraction layer and a second feature extraction layer, and the dimensionality of the association matrix in the second feature extraction layer is variable relative to a dimensionality of the weight matrix in the first feature extraction layer.

In an embodiment, the at least one feature extraction layer further includes at least one third feature extraction layer, the third feature extraction layer includes a masking matrix, the masking matrix is configured to partially mask the association matrix.

In an embodiment, before the second feature extraction layer and the third feature extraction layer, a splitting layer is further included, and the splitting layer is configured to split an output of the first feature extraction layer into triple information and text information; where the first dimensionality transformation layer is configured to perform a dimensionality variation on the weight matrix obtained by the first feature extraction layer to obtain the output matrix after a dimensionality reduction as the input of the second feature extraction layer, or is configured to perform a dimensionality variation on the triple information to obtain a matrix after the dimensionality reduction as the input of the second feature extraction layer; a second dimensionality transformation layer is further included between the first feature extraction layer and the third feature extraction layer, and the second dimensionality transformation layer is configured to perform the dimensionality variation on the weight matrix obtained by the first feature extraction layer to obtain an output matrix after the dimensionality variation as an input of the third feature extraction layer, or is configured to perform a dimensionality variation on the text information to obtain a matrix after the dimensionality reduction as an input of the third feature extraction layer.

In an embodiment, processing the sample text based on the triple to obtain knowledge fusion vector includes: inserting the triple in the target text into the target text to obtain the knowledge fusion vector.

In an embodiment, processing the sample text based on the triple to obtain knowledge fusion vector includes: determining a text embedding vector corresponding to the target text; determining a knowledge embedding vector corresponding to the triple; and fusing the text embedding vector and the knowledge embedding vector, to obtain the knowledge fusion vector.

In an embodiment, the target model includes a fine-tuning model, and the fine-tuning model includes at least one of the following: a convolutional neural network model (CNN); a recurrent neural network model (RNN); a gated recurrent unit model (GRU); a fully connected layer (FC); and a long short-term memory model (LSTM).

According to the embodiments of the present disclosure, a text processing apparatus is provided, including a processor, where the processor is configured to obtain a target text; determine triple in the target text, where the triple includes two entities in the target text and a relation between the two entities; process the target text based on the triple to obtain a knowledge fusion vector; and input the knowledge fusion vector into a target model to obtain a processing result of the target text; where, the target model includes at least one feature extraction layer, and the feature extraction layer is configured to perform a linear transformation on the knowledge fusion vector, to obtain at least two knowledge fusion matrices including a first knowledge fusion matrix and a second knowledge fusion matrix; determine an association matrix according to the first knowledge fusion matrix, where the association matrix represents the association relation between at least one entity in the target text and tokens in the target text; and determine a weight matrix according to the second knowledge fusion matrix and the association matrix, where the weight matrix represents the weight between the at least one entity and the target text.

In an embodiment, the apparatus includes but is not limited to terminals or servers, the terminals include but are not limited to electronic devices such as mobile phones, tablet computers, wearable devices, personal computers, Internet of things devices, etc., and the servers include but are not limited to local servers, cloud servers.

In an embodiment, the processor is configured to fuse the target text and the triple in the target text to obtain a knowledge fusion vector.

In an embodiment, the processor is configured to insert the triple in the target text into the target text to obtain the knowledge fusion vector.

In an embodiment, the processor is configured to determine a text embedding vector corresponding to the target text, determine a knowledge embedding vector corresponding to the triple, and fuse the text embedding vector and the knowledge embedding vector, to obtain the knowledge fusion vector.

In an embodiment, the target model includes at least one feature extraction layer, and the feature extraction layer is configured to perform a linear transformation on the knowledge fusion vector to obtain at least two knowledge fusion matrices including the first knowledge fusion matrix and the second knowledge fusion matrix; determine an association matrix according to the first knowledge fusion matrix, where the association matrix represents the association relation between at least one entity in the target text and the target text; and determine a weight matrix according to the second knowledge fusion matrix and the association matrix, where the weight matrix represents weight between the at least one entity and the target text.

In an embodiment, the at least one feature extraction layer at least includes a first feature extraction layer and a second feature extraction layer, and the dimensionality of the association matrix in the second feature extraction layer is variable relative to a dimensionality of the weight matrix in the first feature extraction layer.

In an embodiment, the at least one feature extraction layer further includes at least one third feature extraction layer, the third feature extraction layer includes a masking matrix, the masking matrix is configured to partially mask the association matrix.

After training based on the method described in the above embodiment and obtaining the target model, the apparatus may store the target model, and then subsequently perform processing on the input target text, e.g., processing on the target text, including but not limited to at least one of the following: semantic understanding, for example, which may generate the semantics of the target text; translation, for example, which may generate the corresponding content of the target text in other languages; prediction generation, for example, which may predict the content that appears after the target text and display the predicted content; and word order adjustment, for example, which may adjust the word order of the target text to the correct word order.

In an embodiment, on the basis of obtaining the target model, the fine-tuning model may be further trained, the overall model is obtained through the target model and the fine-tuning model, and the output of the overall model includes at least one of the following information: translation information of the text data, reply information of the text data, and classification information (e.g., emotion classification, etc.) of the text data or association relation between the text data and other reference text data. Different fine-tuning models may be trained to enable the overall model output different information.

In an embodiment, the apparatus further includes an interaction module, configured to determine whether to obtain a triple in the target text based on a knowledge graph according to a user operation; where, when determining to obtain the triple in the target text based on the knowledge graph, determine triple corresponding to the target text in the knowledge graph; and when determining to obtain the triple in the target text not based on the knowledge graph, determine the triple in the target text.

Figure 20:
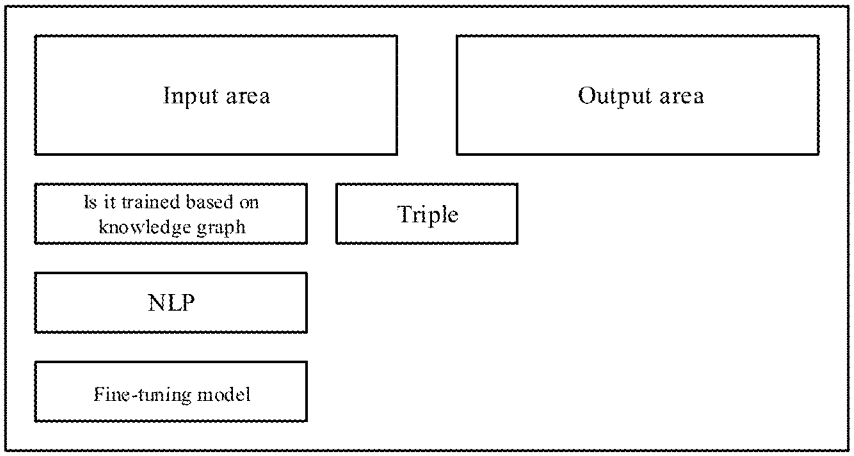
FIG. 20 is an interaction diagram according to an embodiment of the present disclosure.

FIG. 20 is an interaction diagram according to an example of the present disclosure.

As illustrated in FIG. 20, for example, the interaction module includes a screen with integrated touch function. An input area and an output area are displayed on the screen. The user may input the target text in the input area. After the target text is processed by the target model, a processing result may be displayed in the output area.

In an embodiment, the interaction module is further configured to display the triple corresponding to the target text in the knowledge graph, adjust the displayed triple according to a user operation, and use the adjusted triple as the triple corresponding to the target text in the knowledge graph.

In an embodiment, the interaction module is further configured to, when determining to obtain the target model trained based on the knowledge graph, receive a triple input by a user as the triple corresponding to the target text in the knowledge graph. That is, the user may directly input a triple as the triple corresponding to the target text in the knowledge graph as needed.

In an embodiment, the interaction module may further display the determined triple, and the user may independently determine whether the triple is reasonable, if not, the user may adjust the displayed triple, and the interaction module uses the adjusted triple as the triple corresponding to the target text in the knowledge graph.

In an embodiment, the interaction module is further configured to select the target model according to a user operation, where the target model includes at least one of the following: CNN, RNN, GRU, LSTM, Transformer, Transformer-XL.

In an embodiment, when the target model includes Transformer and/or Transformer-XL, the interaction module is further configured to determine a fine-tuning model according to a user operation.

In an embodiment, when the target model includes Transformer and/or Transformer-XL, the interaction module is further configured to determine a fine-tuning model according to a user operation.

When the NLP model includes Transformer and/or Transformer-XL, the process of training the NLP model is mainly pre-training, and a fine-tuning model may be added for training according to specific tasks. In this case, the user may perform an operation on the interaction module to select a type of fine-tuned models. For example, several types of fine-tuned models may be displayed in the drop-down menu, and the user may select one of them for training.

Optionally, the fine-tuning model includes at least one of the following: CNN, RNN, GRU, and LSTM.

According to the embodiments of the present disclosure, a computer readable storage medium storing a computer program is provided, where the program is executed by a processor to implement the steps in the method for training a natural language processing model and/or the text processing method described above.

Figure 21:
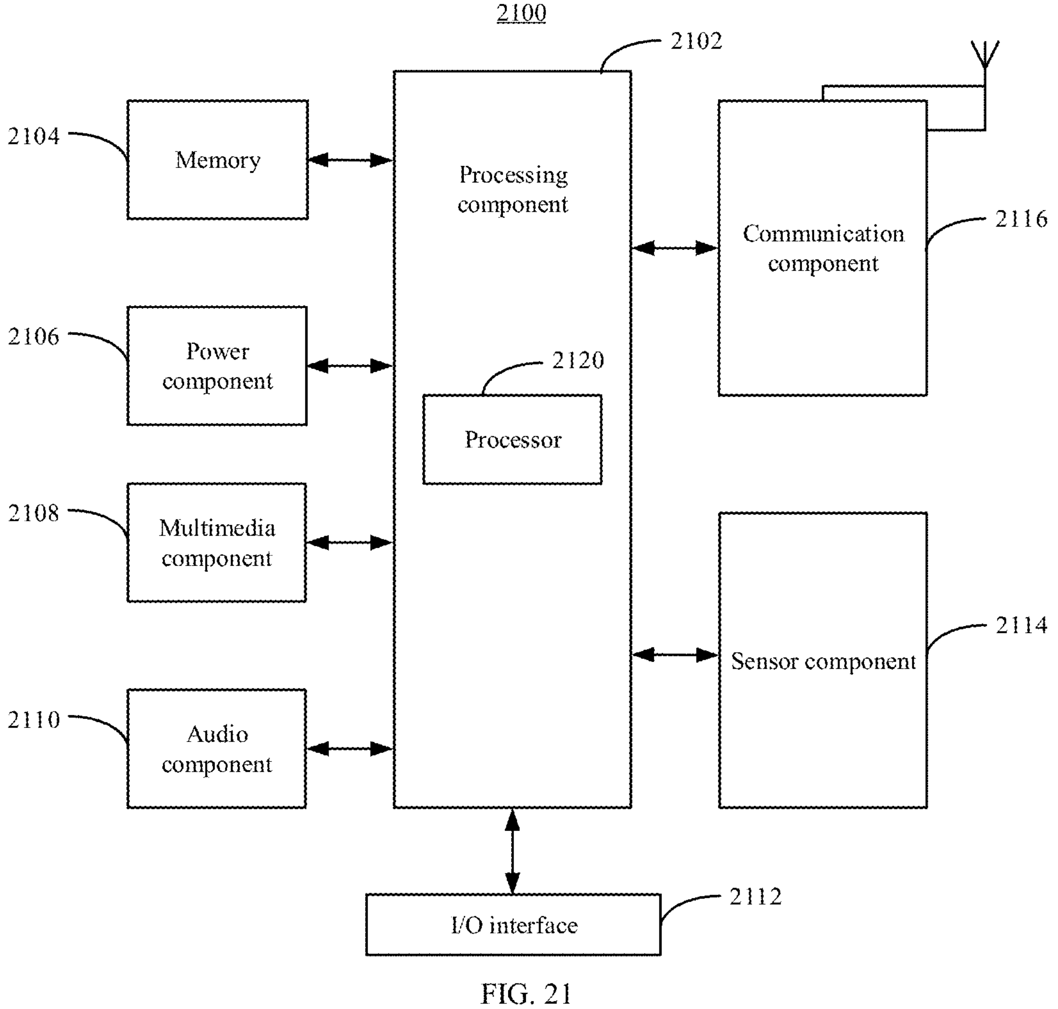
FIG. 21 is a block diagram of an apparatus for training an NLP model according to an embodiment of the present disclosure.

FIG. 21 is a block diagram of an apparatus 2100 for training an NLP model according to an embodiment of the present disclosure. For example, the apparatus 2100 may be a mobile phone, a computer, a digital broadcast terminal, a message transmitting and receiving device, a gaming console, a tablet device, a medical device, a fitness device, a personal digital assistant, etc.; or may be a server.

Referring to FIG. 21, the apparatus 2100 may include one or more of the following components: a processing component 2102, a memory 2104, a power supply component 2106, a multimedia component 2108, an audio component 2110, an input/output (I/O) interface 2112, a sensor component 2114, and a communication component 2116.

The processing component 2102 usually controls overall operations of the apparatus 2100, such as operations related to display, a telephone call, data communication, a camera operation, and a recording operation. The processing assembly 2102 may include one or more processors 2120 to execute instructions to complete all or a part of the steps of the above methods. In addition, the processing component 2102 may include one or more modules to facilitate the interaction between the processing component 2102 and other components. For example, the processing component 2102 may include a multimedia module to facilitate the interaction between the multimedia component 2108 and the processing component 2102.

The memory 2104 is configured to store different types of data to support the operations of the apparatus 2100. Examples of such data include instructions, contact data, phonebook data, messages, pictures, videos, and so on for any application or method that operates on the apparatus 2100. Memory 2104 may be implemented by any type of volatile or non-volatile storage device, or a combination thereof, such as static random access memory (SRAM), electrically erasable programmable read-only memory (EEPROM), erasable programmable memory read-only memory (EPROM), programmable read-only memory (PROM), read-only memory (ROM), magnetic memory, flash memory, magnetic or optical disk.

The power supply component 2106 provides power for different components of the apparatus 2100. The power supply component 2106 may include a power management system, one or more power supply, and other components associated with generating, managing and distributing power for the apparatus 2100.

The multimedia component 2108 includes a screen for providing an output interface between the apparatus 2100 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, sliding movement, and gestures on the TP. The touch sensors may not only sense a boundary of a touch or sliding movement, but further sense a duration and a pressure associated with the touch or sliding movement. In some embodiments, the multimedia component 2108 may include a front camera and/or a rear camera. When the apparatus 2100 is in an operation mode, such as a shooting mode or a video mode, the front camera and/or the rear camera can receive external multimedia data. Each of the front camera and the rear camera may be a fixed optical lens system or have focal length and optical zooming capability.

The audio component 2110 is configured to output and/or input an audio signal. For example, the audio component 2110 includes a microphone (MIC). When the apparatus 2100 is in an operating mode, such as a call mode, a recording mode and a voice recognition mode, the microphone is configured to receive an external audio signal. The received audio signal may be further stored in the memory 2104 or sent via the communication component 2116. In some embodiments, the audio component 2110 further includes a loudspeaker for outputting an audio signal.

The I/O interface 2112 may provide an interface between the processing component 2102 and peripheral interface modules. The above peripheral interface modules may include a keyboard, a click wheel, buttons and so on. These buttons may include but not limited to, a home button, a volume button, a start button and a lock button.

The sensor component 2114 includes one or more sensors for providing state assessments in different aspects for the apparatus 2100. For example, the sensor component 2114 may detect an on/off state of the apparatus 2100 and a relative location of components. For example, the components are a display and a keypad of the apparatus 2100. The sensor component 2114 may also detect a position change of the apparatus 2100 or a component of the apparatus 2100, presence or absence of a touch of a user on the apparatus 2100, an orientation or acceleration/deceleration of the apparatus 2100, and a temperature change of the apparatus 2100. The sensor component 2114 may include a proximity sensor for detecting the existence of a nearby object without any physical touch. The sensor component 2114 may further include an opto-sensor, such as a Complementary Metal-Oxide-Semiconductor (CMOS) or Charged Coupled Device (CCD) image sensor applied in an imaging application. In some embodiments, the sensor component 2114 may further include an acceleration sensor, a gyroscope sensor, a magnetic sensor, a pressure sensor, or a temperature sensor.

The communication component 2116 is configured to facilitate wired or wireless communication between the apparatus 2100 and other devices. The apparatus 2100 may access a wireless network based on a communication standard, such as WiFi, 2G or 3G, 4G LTE, 5G NR, or a combination thereof. In an illustrative embodiment, the communication component 2116 receives a broadcast signal or broadcast related information from an external broadcast management system via a broadcast channel. In an illustrative embodiment, the communication component 2116 may further include a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth (BT) technology and other technologies.

In illustrative embodiments, the apparatus 2100 may be implemented by one or more Application Specific Integrated Circuits (ASIC), Digital Signal Processors (DSP), Digital Signal Processing Devices (DSPD), Programmable Logic Devices (PLD), Field Programmable Gate Arrays (FPGA), controllers, micro-controllers, microprocessors or other electronic elements, for executing the method in any one of the above examples.

In illustrative embodiments, a non-transitory computer readable storage medium including instructions, such as the memory 2104 containing instructions, is further provided. The above instructions may be executed by the processor 2120 of the apparatus 2100 to complete the above method. For example, the non-transitory computer readable storage medium may be a Read-Only Memory (ROM), a Random Access Memory (RAM), a CD-ROM, a magnetic tape, a floppy disk and an optical data storage device, etc.

After considering the specification and practicing the present disclosure, those skilled in the art may easily conceive of other implementations of the present disclosure. The present disclosure is intended to cover any variations, uses, modification or adaptations of the present disclosure that follow the general principles thereof and include common knowledge or conventional technical means in the art that are not disclosed in the present disclosure. The specification and examples herein are intended to be illustrative only and the real scope and spirit of the present disclosure are indicated by the claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

It is to be noted that the relational terms such as "first" and "second" used herein are merely intended to distinguish one entity or operation from another entity or operation rather than to require or imply any such actual relation or order existing between these entities or operations. Further, the term "include", "comprise" or any variation thereof is intended to encompass non-exclusive inclusion, so that a process, method, article or device including a series of elements includes not only those elements but further other elements not listed explicitly or those elements inherent to such a process, method, product or device. Without more restrictions, the elements defined by the sentence "including a . . . " do not exclude the existence of other identical elements in the process, method, product or device.

The method and apparatus provided by the present disclosure are described above in detail. The principle and implementation of the present disclosure are described herein through specific examples. The description about the embodiments of the present disclosure is merely provided for ease of understanding of the method and core ideas of the present disclosure. Persons of ordinary skill in the art can make variations and modifications to the present disclosure in terms of the specific implementations and application scopes according to the ideas of the present disclosure. Therefore, the specification shall not be construed as a limit to the present disclosure.

The invention claimed is:

1. A-text processing method, comprising:

obtaining a target text;

determining a triple corresponding to the target text, wherein the triple comprises two entities in the target text and a relation between the two entities;

obtaining a knowledge fusion vector by processing the target text based on the triple; and inputting the knowledge fusion vector into a target model to obtain a processing result of the target text;

wherein the target model comprises at least one feature extraction layer, and the feature extraction layer is configured to:

perform a linear transformation on the knowledge fusion vector, to obtain at least two knowledge fusion matrices comprising a first knowledge fusion matrix and a second knowledge fusion matrix;

determine an association matrix according to the first knowledge fusion matrix, wherein the association matrix represents association relation between at least one entity in the target text and tokens in the target text; and determine a weight matrix according to the second knowledge fusion matrix and the association matrix, wherein the weight matrix represents weight between the at least one entity and the target text.

2. The method according to claim 1, wherein the at least one feature extraction layer comprises a first feature extraction layer and a second feature extraction layer, and a dimensionality of the association matrix in the second feature extraction layer is variable relative to a dimensionality of the weight matrix in the first feature extraction layer.

3. The method according to claim 2, wherein the at least one feature extraction layer further comprises at least one third feature extraction layer, and the third feature extraction layer comprises a masking matrix, the masking matrix is configured to perform partial masking on the association matrix.

4. The method according to claim 3, wherein the target model comprises a first dimensionality transformation layer between the first feature extraction layer and the second feature extraction layer, and the first dimensionality transformation layer is configured to:

perform a dimensionality variation on the weight matrix in the first feature extraction layer to obtain an output matrix after the dimensionality variation, wherein the output matrix is as an input of the second feature extraction layer, to implement dimensionality variation between feature extraction layers.

5. The method according to claim 4, wherein before the second feature extraction layer and the at least one third feature extraction layer, the target model further comprises a splitting layer configured to split an output of the first feature extraction layer into triple information and text information;

wherein the first dimensionality transformation layer is configured to:

perform a dimensionality variation on the weight matrix in the first feature extraction layer to obtain the output matrix after a dimensionality reduction as the input of the second feature extraction layer; or perform a dimensionality variation on the triple information to obtain a matrix after a dimensionality reduction as the input of the second feature extraction layer; and wherein the target model further comprises a second dimensionality transformation layer between the first feature extraction layer and the at least one third feature extraction layer, and configured to:

perform a dimensionality variation on the weight matrix in the first feature extraction layer to obtain an output matrix after a dimensionality reduction as an input of the at least one third feature extraction layer; or perform a dimensionality variation on the text information to obtain a matrix after a dimensionality reduction as an input of the at least one third feature extraction layer.

6. The method according to claim 1, wherein processing the target text comprises:

inserting the triple in the target text into the target text to obtain the knowledge fusion vector.

7. The method according to claim 1, wherein processing the target text comprises:

determining a text embedding vector corresponding to the target text;

determining a knowledge embedding vector corresponding to the triple; and fusing the text embedding vector and the knowledge embedding vector, to obtain the knowledge fusion vector.

8. The method according to claim 7, wherein the triple comprises:

a head entity, a relation, or a tail entity.

9. The method according to claim 8, wherein determining the knowledge embedding vector corresponding to the triple comprises:

fusing an embedding vector of the head entity, an embedding vector of the relation, and an embedding vector of the tail entity, to obtain the knowledge embedding vector.

10. The method according to claim 7, wherein the text embedding vector comprises at least one of the following:

a sentence embedding vector, a position embedding vector corresponding to the tokens, or a task type embedding vector.

11. The method according to claim 7, wherein the knowledge embedding vector comprises:

an embedding vector of the entities belonging to the triple;

an embedding vector of the relation belonging to the triple; or both.

12. The method according to claim 7, wherein the at least one feature extraction layer comprises a fourth feature extraction layer and a fifth feature extraction layer, wherein fusing the text embedding vector and the knowledge embedding vector comprises:

performing feature extraction on the text embedding vector through the fourth feature extraction layer to obtain a text feature vector;

performing feature extraction on the knowledge embedding vector through the fifth feature extraction layer to obtain a knowledge feature vector; and fusing the text feature vector and the knowledge feature vector, to obtain the knowledge fusion vector.

13. The method according to claim 12, wherein fusing the text feature vector and the knowledge feature vector is by using a multi-layer neural network layer.

14. The method according to claim 7, wherein fusing the text embedding vector and the knowledge embedding vector comprises:

fusing the text embedding vector and the knowledge embedding vector according to a knowledge fusion model.

15. The method according to claim 1, wherein the target model comprises a fine-tuning model, the fine-tuning model comprises at least one of the following:

a convolutional neural network model (CNN);

a recurrent neural network model (RNN);

a gated recurrent unit model (GRU);

a fully connected layer (FC); or a long short-term memory model (LSTM).

16. A non-transitory computer readable storage medium storing a computer program, wherein the program is executed by a processor to implement method according to claim 1.

17. A text processing apparatus, comprising a processor and a memory storing a computer program, wherein when executing the computer program, the processor is caused to:

obtain a target text;

determine a triple corresponding to the target text, wherein the triple comprises two entities in the target text and a relation between the two entities;

obtain a knowledge fusion vector by processing the target text based on the triple; and input the knowledge fusion vector into a target model to obtain a processing result of the target text;

wherein the target model comprises at least one feature extraction layer, and the feature extraction layer is configured to:

perform a linear transformation on the knowledge fusion vector, to obtain at least two knowledge fusion matrices comprising a first knowledge fusion matrix and a second knowledge fusion matrix;

determine an association matrix according to the first knowledge fusion matrix, wherein the association matrix represents association relation between at least one entity in the target text and tokens in the target text; and determine a weight matrix according to the second knowledge fusion matrix and the association matrix, wherein the weight matrix represents weight between the at least one entity and the target text.

18. The apparatus according to claim 17, the processor is further caused to:

determine whether to obtain the triple corresponding to the target text based on a knowledge graph according to a user operation; wherein when determining to obtain the triple corresponding to the target text based on the knowledge graph, determine the triple corresponding to the target text in the knowledge graph; and when determining to obtain the triple corresponding to the target text not based on the knowledge graph, determine the triple corresponding to the target text.

19. The apparatus according to claim 18, wherein the processor is further caused to:

display the triple corresponding to the target text in the knowledge graph; and adjust the displayed triple according to a user operation, and use the adjusted triple as the triple corresponding to the target text in the knowledge graph.

20. The apparatus according to claim 18, wherein the processor is further caused to, when determining to obtain the target model trained based on the knowledge graph, receive a triple input by a user as the triple corresponding to the target text in the knowledge graph.

* * * * *